United States Patent
Nishida

(10) Patent No.: US 7,508,987 B2
(45) Date of Patent: Mar. 24, 2009

(54) METHOD, APPARATUS, SYSTEM, AND PROGRAM FOR IMAGE PROCESSING CAPABLE OF RECOGNIZING, REPRODUCING, AND ENHANCING AN IMAGE, AND A MEDIUM STORING THE PROGRAM

(75) Inventor: Hirobumi Nishida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 866 days.

(21) Appl. No.: 10/912,060

(22) Filed: Aug. 6, 2004

(65) Prior Publication Data

US 2005/0031220 A1 Feb. 10, 2005

(30) Foreign Application Priority Data

Aug. 8, 2003 (JP) .............................. 2003-290614

(51) Int. Cl.
*G06K 9/46* (2006.01)
*G06K 9/00* (2006.01)

(52) U.S. Cl. ....................... 382/204; 382/165

(58) Field of Classification Search ................ 382/112, 382/173, 176, 180, 190, 204, 206, 254, 274, 382/165

See application file for complete search history.

(56) References Cited

U.S. PATENT DOCUMENTS

| | | | |
|---|---|---|---|
| 5,067,165 A | 11/1991 | Nishida | |
| 5,204,915 A | 4/1993 | Nishida | |
| 5,313,528 A | 5/1994 | Nishida | |
| 5,317,649 A | 5/1994 | Nishida | |
| 5,497,432 A | 3/1996 | Nishida | |
| 5,524,070 A | 6/1996 | Shin et al. | |
| 5,701,363 A * | 12/1997 | Hanyuh | 382/174 |
| 5,889,885 A * | 3/1999 | Moed et al. | 382/172 |
| 5,930,393 A | 7/1999 | Ho et al. | |
| 5,974,195 A * | 10/1999 | Kawazome et al. | 382/266 |
| 5,982,940 A * | 11/1999 | Sawada | 382/260 |
| 6,028,677 A * | 2/2000 | Keithley | 358/1.9 |
| 6,041,138 A | 3/2000 | Nishida | |
| 6,347,156 B1 * | 2/2002 | Kamada et al. | 382/237 |

(Continued)

FOREIGN PATENT DOCUMENTS

JP  8-340446  12/1996

(Continued)

OTHER PUBLICATIONS

M.Y. Jaishima, E.A. Riskin, R. Ladner, and W. Stuetzle, Model-based restoration of document images for OCR, Proceedings of SPIE vol. 2660, pp. 297-308, 1996.

(Continued)

*Primary Examiner*—Daniel G Mariam
(74) *Attorney, Agent, or Firm*—Dickstein Shapiro LLP

(57) ABSTRACT

A method, apparatus, system, and program for image processing are provided to perform operations of recognizing, reproducing, and enhancing an image, particularly one having character, symbol, or line-segment portions. An image obtainer obtains a multivalue image of color or grayscale. A brightness image generator generates a brightness image of the multivalue image, representing brightness values of respective pixels of the multivalue image. A topographic feature image generator generates a topographic feature image of the multivalue image, having a topographic feature corresponding to the brightness values. A topographic feature adder generates a binary image of the multivalue image, by using information contained in the topographic feature.

30 Claims, 23 Drawing Sheets

U.S. PATENT DOCUMENTS

| | | | |
|---|---|---|---|
| 6,424,746 | B1 | 7/2002 | Nishida |
| 6,577,762 | B1 * | 6/2003 | Seeger et al. ............... 382/173 |
| 6,628,819 | B1 | 9/2003 | Huang et al. |
| 6,747,758 | B1 | 6/2004 | Nishida |
| 2002/0071131 | A1 | 6/2002 | Nishida |
| 2003/0179409 | A1 | 9/2003 | Nishida |
| 2004/0076337 | A1 | 4/2004 | Nishida |

FOREIGN PATENT DOCUMENTS

| | | |
|---|---|---|
| JP | 11-338976 | 12/1999 |
| JP | 2001-118032 | 4/2001 |

OTHER PUBLICATIONS

N.B. Karayiannis and A.N. Venetsanopoulos, Image interpolation based on variational principles, Signal Processing, vol. 25, Issue 3, pp. 259-288, 1991.

L. Koskinen, H. Huttunen, and J.T. Astola, Text enhancement method based on soft morphological filters, Proceedings of SPIE, vol. 2181, pp. 243-253, 1994.

A.D. Kulkarni and K. Sivaraman, Interpolation of digital imagery using hyperspace approximation, Signal Processing, vol. 7, pp. 65-73, 1984.

D. Lee, T. Pavlidis, and G.W. Wasilkowski, A note on the trade-off between sampling and quantization in signal processing, Journal of Complexity, vol. 3, pp. 359-371, 1987.

Seong-Whan Lee and Young Joon Kim, Direct Extraction of Topographic Features for Gray Scale Character Recogition; IEEE Transactions on Pattern Analysis and Machine Intelligence, vol. 17, No. 7, pp. 724-729, Jul. 1995.

J. Liang, R.M. Haralick, and I.T. Phillips, Document image restoration using binary morphological filters, Proceedings of SPIE, vol. 2660, pp. 274-285, 1996.

W. Niblack, An introduction to image processing , pp. 115-116, Englewood Cliffs, NJ; Prentice Hall, 1986.

G. Ramponi and P. Fontanot, Enhancing document images with a quadratic filter, Signal Processing, vol. 33, Issue 1, pp. 23-34, 1993.

Y.C. Shin, R. Sridhar, V. Demjanenko, P.W. Palumbo, and J. Hull, Contrast enhancement of mail piece images, Proceedings of SPIE, vol. 1661, pp. 27-37, 1992.

P.D. Thouin and C.-I. Chang, A method for restoration of low-resolution document images, International Journal on Document Analysis and Recognition, vol. 2, No. 4, pp. 200-210, 2000.

L. Wang and T. Pavlidis, Direct gray-scale extraction of features for character recognition, IEEE Transactions on Pattern Analysis and Machine Intelligence, vol. 15, No. 10, pp. 1053-1067, 1993.

D. Williams and M. Shah, A fast algorithm for active contours and curvature estimation, CVGIP, Image Understanding, vol. 55, No. 1, pp. 14-26, 1992.

T. Suzuki et al., "Binarization of Low-Resolution Document Image by Interpolation and Bump Recognition", IEICE Technical Report Pattern Recognition and Media Understanding, Feb. 22, 2000, pp. 231-245, vol. 99, No. 649, Institute of Electronics, Information and Communication Engineers, Tokyo, Japan.

* cited by examiner emergencies emergencies emergencies emergencies

METHOD, APPARATUS, SYSTEM, AND PROGRAM FOR IMAGE PROCESSING CAPABLE OF RECOGNIZING, REPRODUCING, AND ENHANCING AN IMAGE, AND A MEDIUM STORING THE PROGRAM

BACKGROUND OF THE INVENTION

1. Field of the Invention

The present invention relates to a method, apparatus, system, and program for image processing, and more particularly, a method, apparatus, system, and program for image processing, capable of recognizing, reproducing, and enhancing an image.

2. Description of the Related Art

Future image processors will require a high ability of recognizing and reproducing an image, particularly one produced in low resolution.

For example, a color image is usually read by a color image scanner, taken by a digital camera (including the one incorporated in a portable phone), or copied by a digital color copier, with low resolution of about 200 dpi to 300 dpi, to achieve high image processing speed and to save a memory area. The low-resolution image is then transferred to another device as an image file having a predetermined format, such as TIF, JPEG, and GIF, for further image processing.

However, if the low-resolution image contains a character or line portion, that portion of the image may not be accurately recognized, or it may not be produced in high quality. This is particularly true when the image contains densely-arranged line segments, as the line segments may be wrongly recognized as a background of the image.

BRIEF SUMMARY OF THE INVENTION

The present invention provides an apparatus, method, system, and related computer program product or medium, for image processing, capable of recognizing, reproducing, and enhancing an image, particularly one having character, symbol or line segment portions.

In one exemplary embodiment, an image processor includes an image obtainer, a brightness image generator, a topographic feature image generator, and a topographic feature adder.

The image obtainer obtains an original image, preferably a multivalue image of color or grayscale. If the image obtainer receives a color multivalue image, the image obtainer converts the received image from a color image to a grayscale image.

The brightness image generator generates a brightness image of the multivalue image. The brightness image may be expressed in a XYZ coordinate system, with X corresponding to the main scanning directions of the respective pixels in the multivalue image, Y corresponding to the subscanning directions of the respective pixels in the multivalue image, and Z corresponding to the brightness values of the respective pixels in the multivalue image.

The topographic feature image generator generates a topographic feature image of the multivalue image, having a topographic feature corresponding to the brightness values of the brightness image. For example, the topographic feature image includes a peak/ridge region, a hillside region, and a valley/pit region. The peak/ridge region has a brightness value range higher than that of the hillside region. The valley/pit region has a brightness value range lower than that of the hillside region.

If the multivalue image can be divided into a character or line portion and a background portion, the valley/pit region of the topographic feature image corresponds to the character or line portion, while the peak/ridge region of the topographic feature image corresponds to the background portion.

The topographic feature adder generates a binary image of the multivalue image, by using information contained in the topographic feature of the topographic feature image. Specifically, by comparing the binary image and the topographic feature image, the topographic feature adder corrects the binary image such that the character/line portion of the binary image corresponds to the valley/pit region of the topographic feature image, and the background portion of the binary image corresponds to the peak/ridge region of the topographic feature image.

In another exemplary embodiment, the image processor may further include a high-resolution image generator, which generates a high-resolution image by increasing a resolution of the multivalue image.

In such a case, the binary image is generated from the high-resolution image.

Further, the brightness image may be generated from the high-resolution image, however, it may be generated from the multivalue image, as described above.

In another exemplary embodiment, the image processor may further include a pre-binary image generator, which generates a pre-binary image, having a number of brightness values less than a number of the brightness values of the multivalue image.

For example, the pre-binary image includes on pixels, off pixels, and TBD ("To Be Determined") pixels. The on pixels correspond to the character or line portion of the multivalue image. The off pixels correspond to the background portion of the multivalue image. The TBD pixels correspond either to the character or line portion and the background portion of the multivalue image. In other words, the TBD pixels are determined to be the on pixels when the TBD pixels correspond to the valley/pit region of the topographic feature image. On the other hand, the TBD pixels are determined to be the off pixels when the TBD pixels correspond to the peak/ridge region of the topographic feature image.

In such a case, the binary image is generated from the pre-binary image.

Further, the brightness image may be generated from the pre-binary image, however, it may be generated from the multivalue image, as described above.

In another exemplary embodiment, the image processor may further include a brightness slope detector, a slope memory, and a first outline adjuster. The brightness slope detector detects brightness slope values of the respective pixels of the high-resolution image created by the high-resolution image generator. The slope memory stores the brightness slope values. The first outline adjuster enhances and smoothens the outline of the character portion, using the brightness slope values read out from the slope memory.

In another exemplary embodiment, the image processor may further include a second outline adjuster. The second outline adjuster further enhances and smoothens the outline of the character portion, especially by reducing jagginess of the outline, or sharpening the corner of the outline.

In addition to the above-described image processor, the present invention may be implemented as a method, a system, a computer program product, and a computer readable medium, as will be apparent to those skilled in the art, without departing from the scope and spirit of the appended claims.

BRIEF DESCRIPTION OF THE DRAWINGS

A more complete appreciation of the disclosure and many of the related advantages thereof will be readily obtained as the same becomes better understood by reference to the following detailed description when considered in connection with the accompanying drawings, wherein.

DETAILED DESCRIPTION OF THE INVENTION

Figure 1:
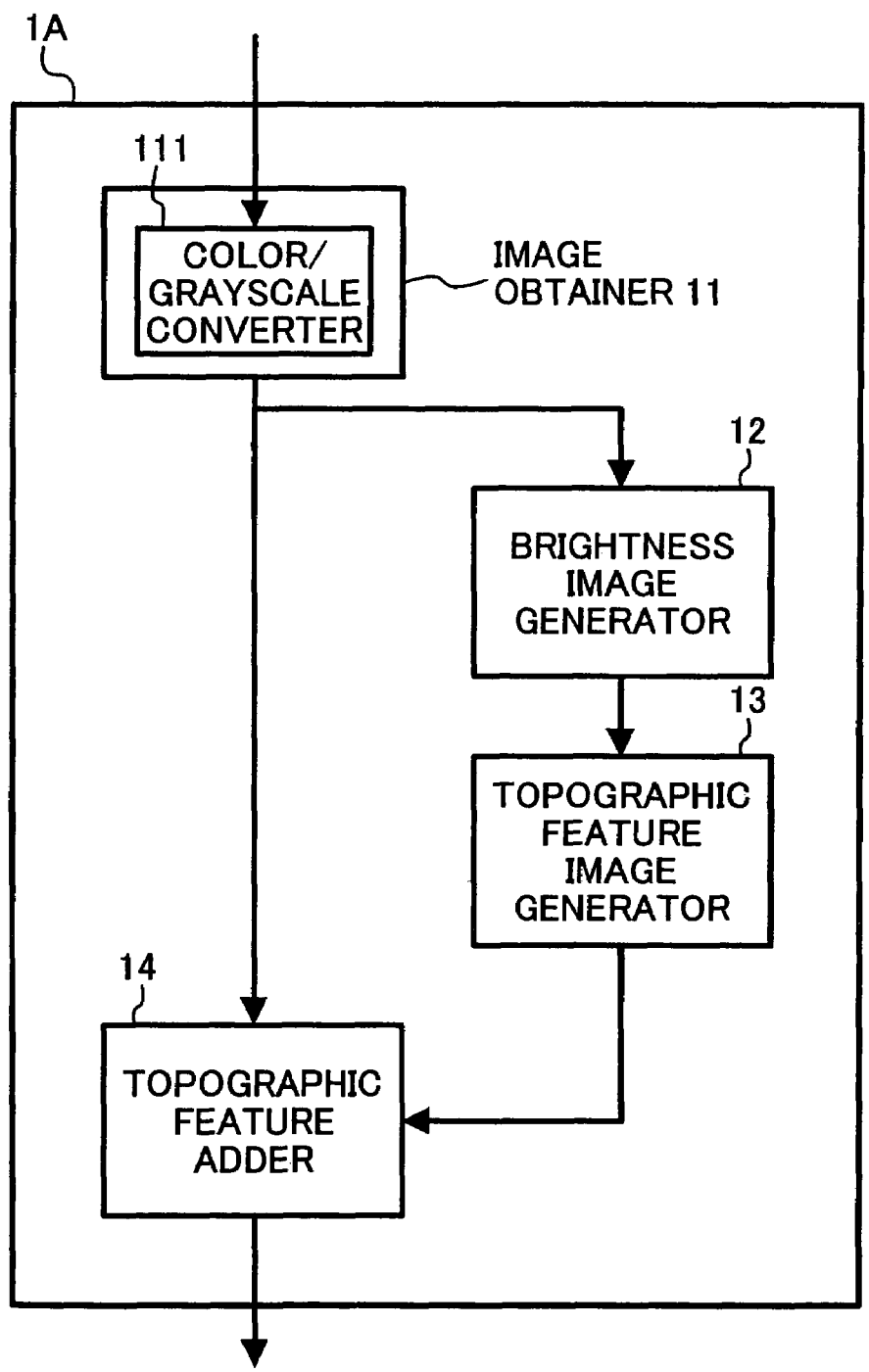
FIG. 1 is a schematic block diagram illustrating a functional structure of an image processor according to a preferred embodiment of the present invention.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. Referring now to the drawings, wherein like reference numerals designate identical or corresponding parts throughout the several views, a description is given for image processors 1A to 1J according to preferred embodiments of the present invention.

The image processors 1A to 1J are capable of recognizing, reproducing or enhancing a multivalue image received from the outside. The multivalue image preferably includes a character (symbol), and/or a line segment, and may be provided in color or in grayscale.

As shown in FIG. 1, the image processor 1A includes an image obtainer 11, a brightness image generator 12, a topographic feature image generator 13, and a topographic feature adder 14.

The image obtainer 11 receives a multivalue image of color or grayscale. If it receives a color multivalue image, the image obtainer 11 converts the color multivalue image to a grayscale multivalue image, using a color/grayscale converter 111 incorporated therein.

The brightness image generator 12 generates a brightness image from the grayscale multivalue image. The brightness image may be expressed, mathematically, as a one-valued function $Z=f(X, Y)$, wherein X corresponds to a main scanning direction of the multivalue image, Y corresponds to a subscanning direction of the multivalue image, and Z corresponds to a brightness value of the multivalue image. In other words, the brightness image expresses the brightness values of respective pixels of the multivalue image as elevation (shown in the z axis) with respect to the pixel position (shown in the xy plane). For example, if the multivalue image is 8-bit, the brightness values range from 0 to 256 grayscale levels, with lower values (that is, darker areas of the image) having lower elevations, and higher values (that is, lighter areas of the image) having higher elevations.

The topographic feature image generator 13 generates a topographic feature image from the brightness image. For example, the brightness image having the 256 brightness values may be interpreted as an elevation image having various topographic regions, such as a peak region, a ridge region, a hillside region, a valley region, and a pit region. These topographic regions of the multivalue image may be interpreted as the topographic feature extracted from the multivalue image based on the brightness values.

The topographic feature adder 14 generates a binary image from the multivalue image, by using the topographic feature of the topographic feature image. Since the topographic feature contains information regarding the brightness values of the multivalue image, it can compensate the information loss generally caused during the binarization process. In this way, the multivalue image may be accurately reproduced in a binary form.

Figure 2:
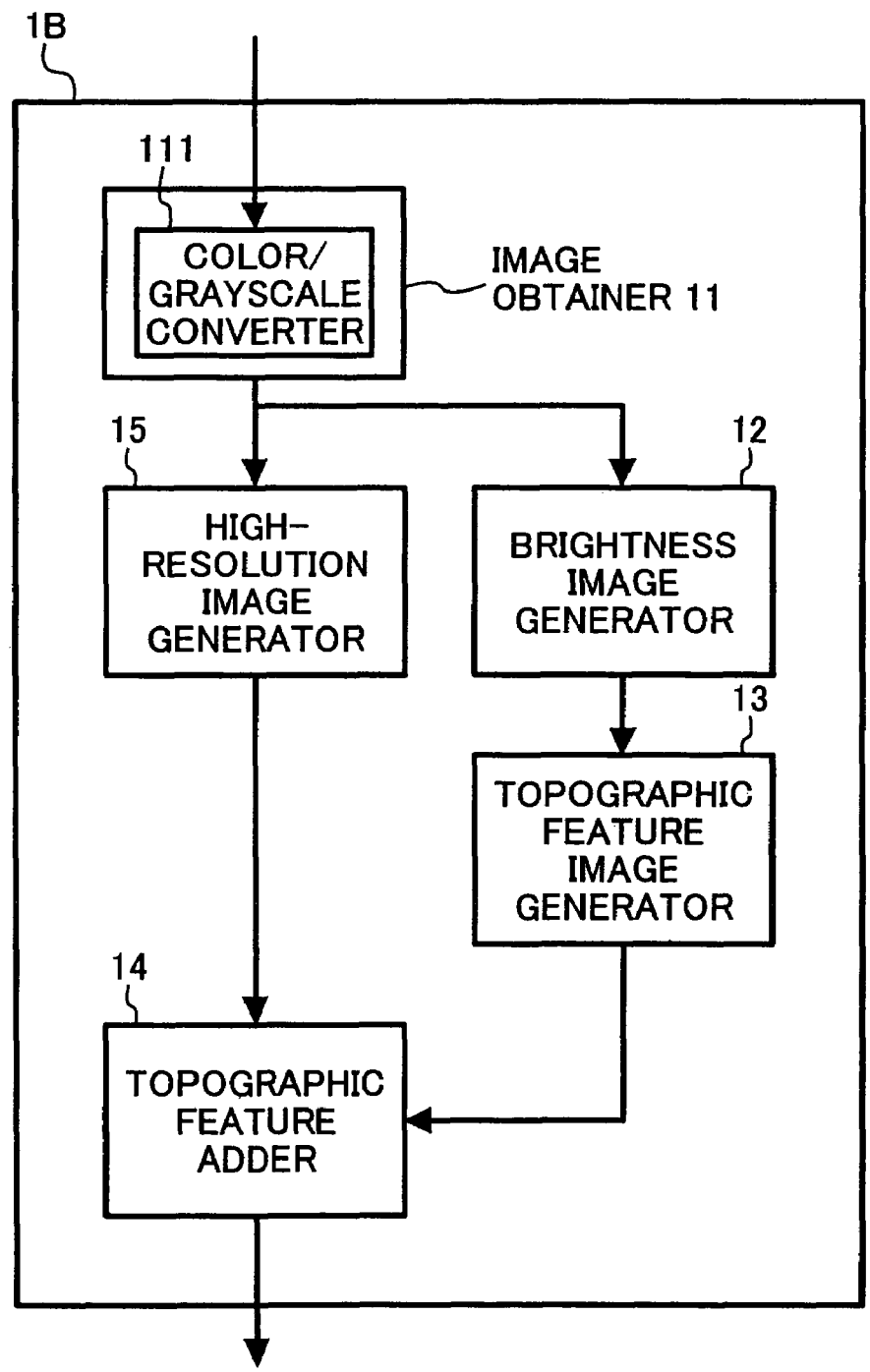
FIG. 2 is a schematic block diagram illustrating an image processor according to another preferred embodiment of the present invention.

Referring to FIG. 2, the image processor 1B is similar in structure to the image processor 1A, except for the addition of a high-resolution image generator 15. The high-resolution image generator 15 generates a high-resolution image from the grayscale multivalue image, by expanding the resolution of the multivalue image using an interpolation technique. The topographic feature adder 14 then generates a high-resolution binary image, by adding the topographic feature to the high-resolution image.

Figure 3:
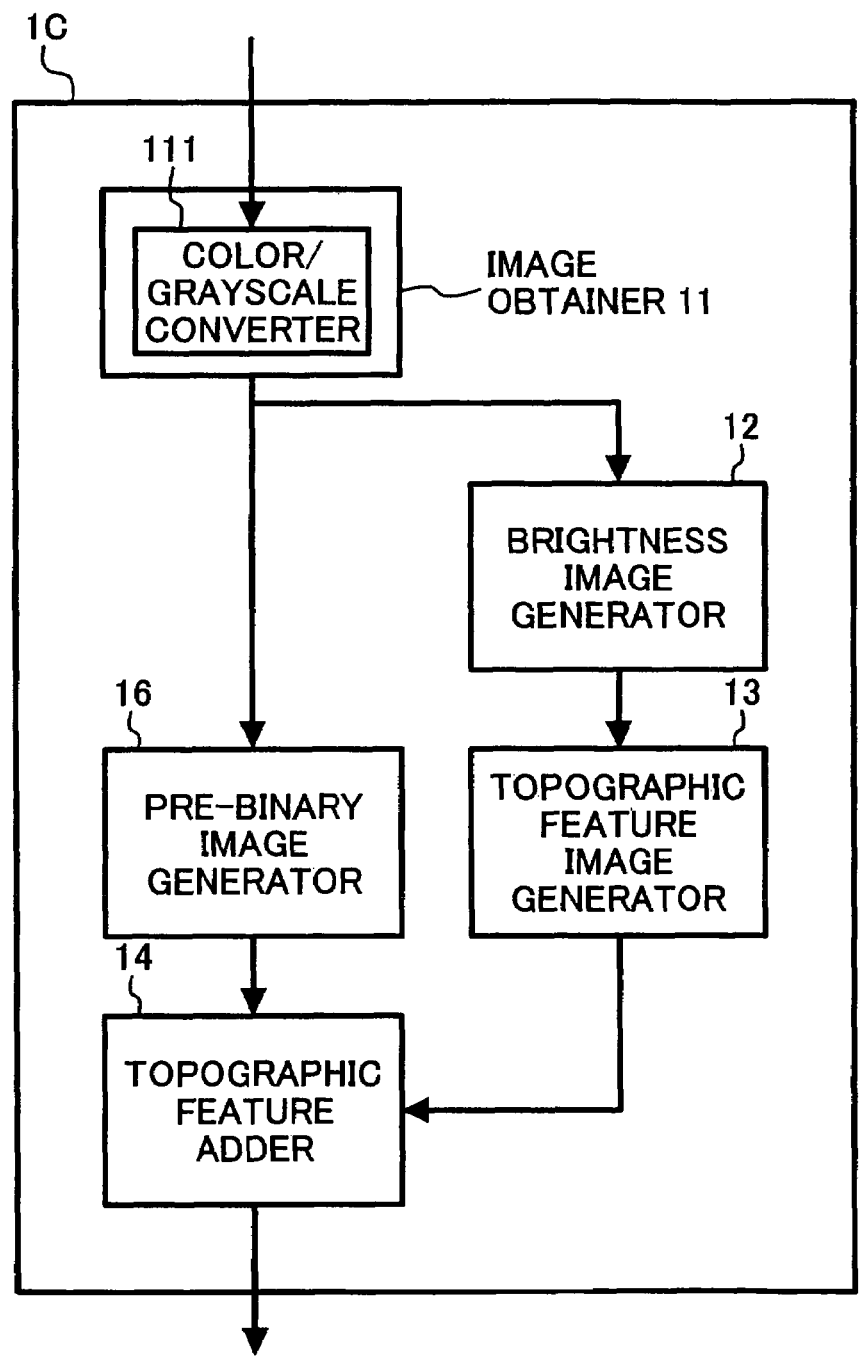
FIG. 3 is a schematic block diagram illustrating a functional structure of an image processor according to another preferred embodiment of the present invention.

Referring to FIG. 3, the image processor 1C is similar in structure to the image processor 1A, except for the addition of a pre-binary image generator 16. The pre-binary image generator 16 generates a pre-binary image from the grayscale multivalue image, instead of directly generating the binary image having 0 and 1 values using only the topographic feature adder 14. More specifically, the pre-binary image generator 16 generates a pre-binary image, having 0, 1 and −1 values, with the −1 value corresponding to the pixel that cannot be determined to be 0 or 1, without having information regarding the topographic feature. Thus, the pixel having the −1 value is determined in the binarization operation performed by the topographic feature adder 14, using the topographic feature provided by the topographic feature image generator 13.

Figure 4:
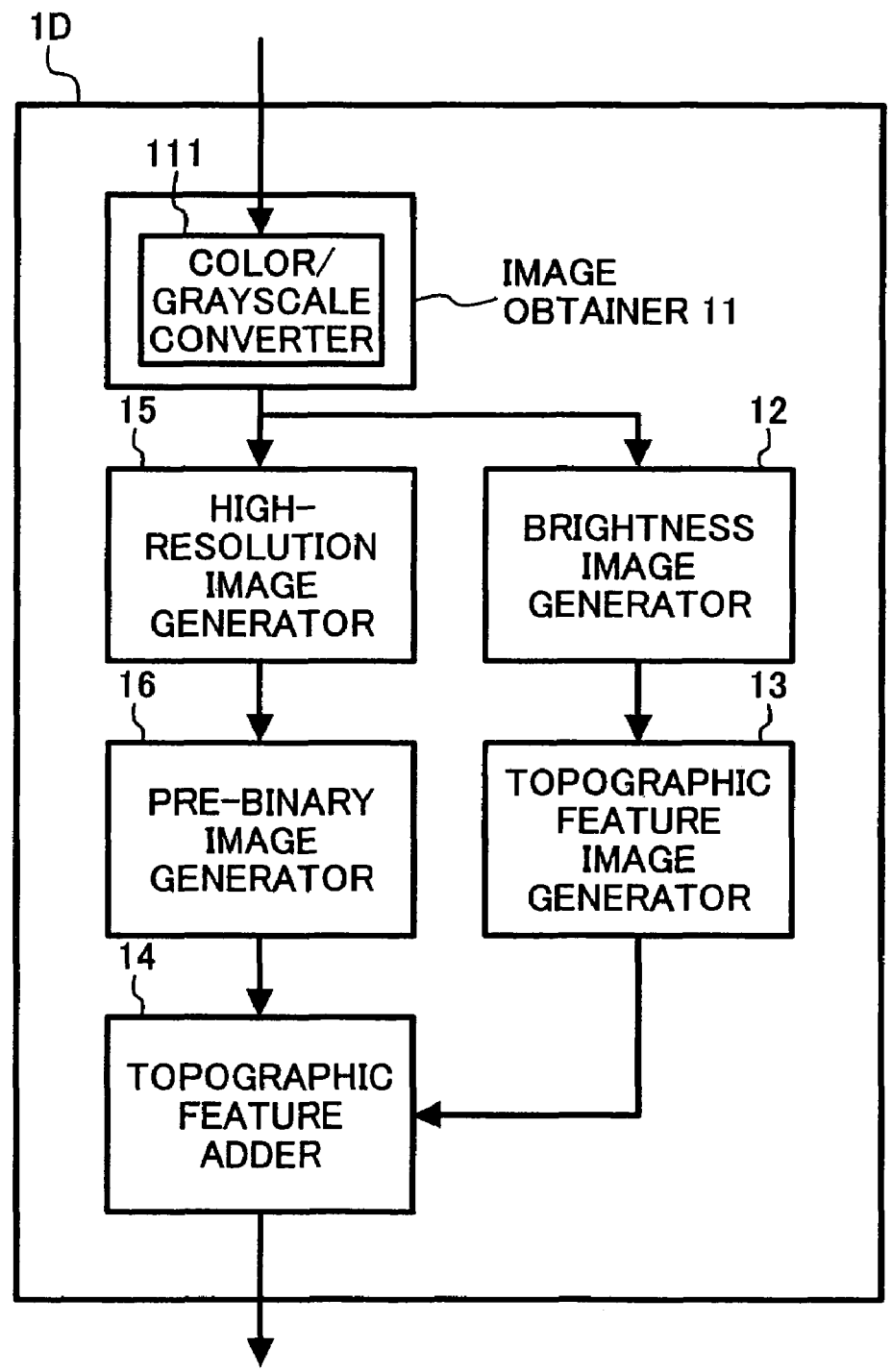
FIG. 4 is a schematic block diagram illustrating a functional structure of an image processor according to another preferred embodiment of the present invention.

Referring to FIG. 4, the image processor 1D is similar in structure to the image processor 1A, except for the addition of the high-resolution image generator 15 and the pre-binary image generator 16. The pre-binary image generator 16 generates a pre-binary image, using the high-resolution image created by the high-resolution image generator 15, in a similar manner as described above.

Figure 5:
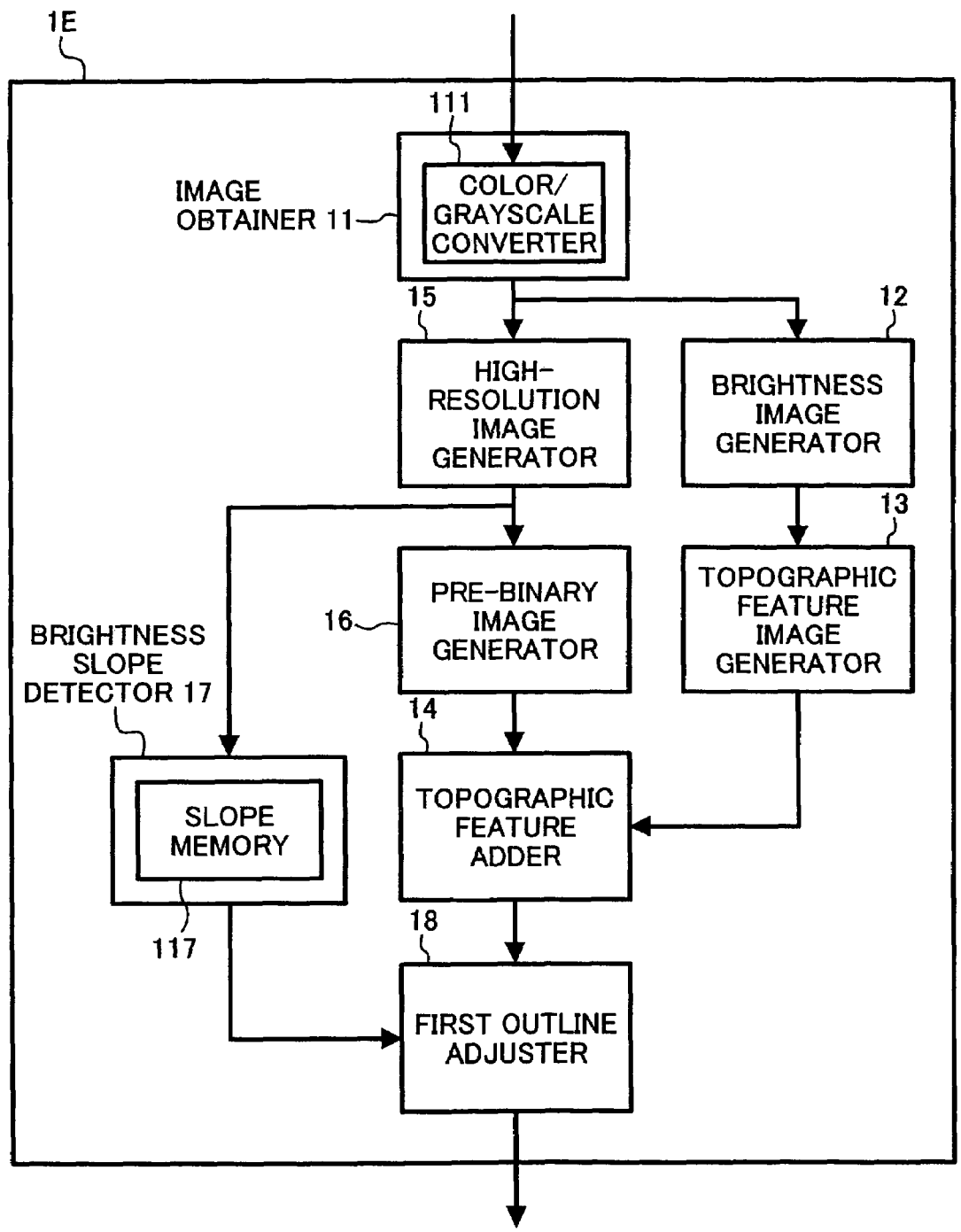
FIG. 5 is a schematic block diagram illustrating a functional structure of an image processor according to another preferred embodiment of the present invention.

Referring to FIG. 5, the image processor 1E is similar in structure to the image processor 1D, except for the addition of a brightness slope detector 17 and a first outline adjuster 18. The brightness slope detector 17 detects a brightness slope value of each pixel contained in the high-resolution multivalue image, and stores it in a slope memory 117. Using information from the brightness slope value, the first outline adjuster 18 enhances and smoothens the edges or outlines in the image. In this example, the binarization operation may be performed by the first outline adjuster 18, rather than by the topographic feature adder 14.

Figure 6:
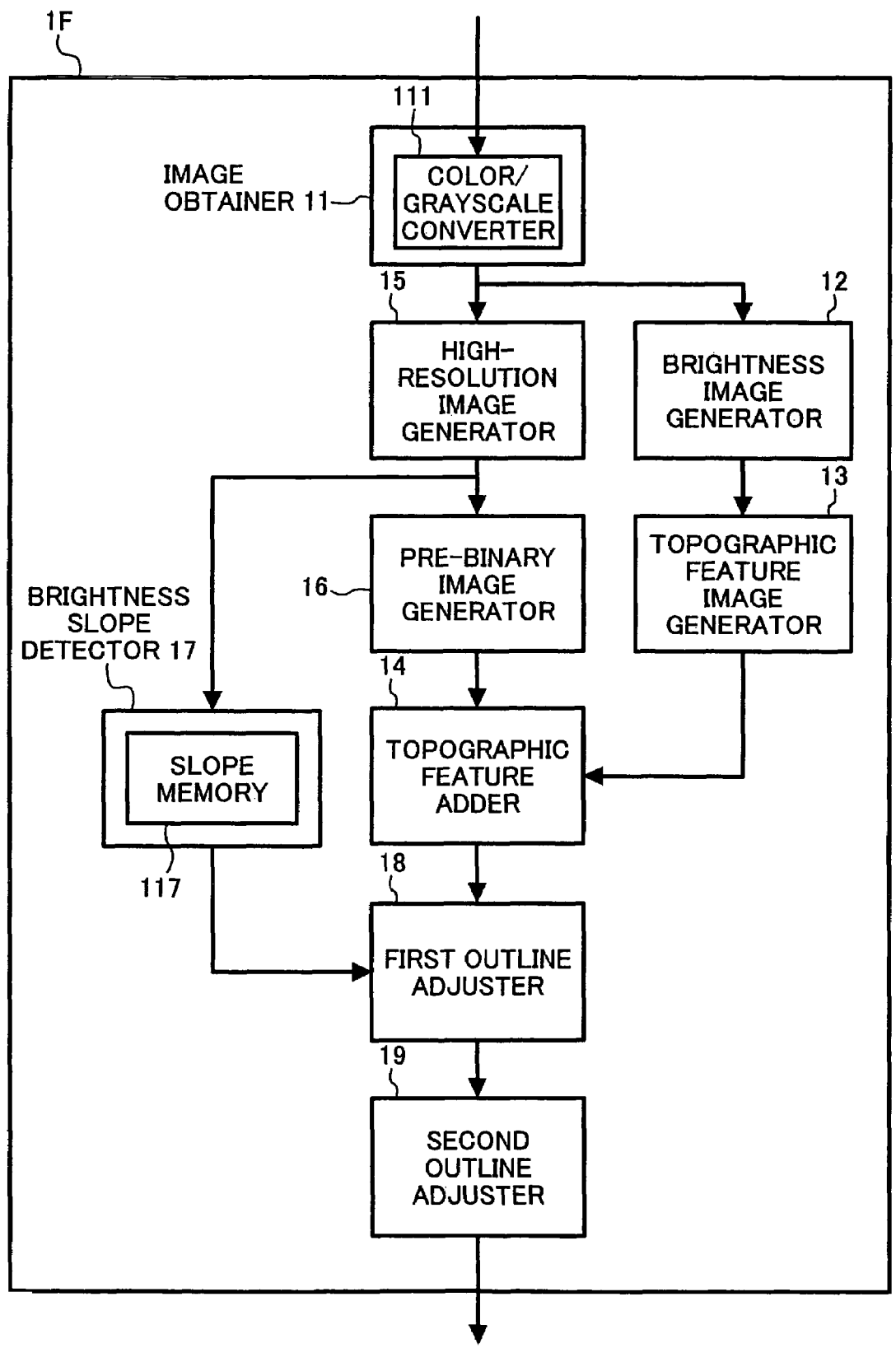
FIG. 6 is a schematic block diagram illustrating a functional structure of an image processor according to another preferred embodiment of the present invention.

Referring to FIG. 6, the image processor 1F is similar in structure to the image processor 1E, except for the addition of a second outline adjuster 19. The second outline adjuster 19 further smoothens the edges or outlines in the image, particularly by reducing jaggy of the edges or outlines and adjusting a crossed point (intersection) of vertical and horizontal lines in the image.

Figure 7:
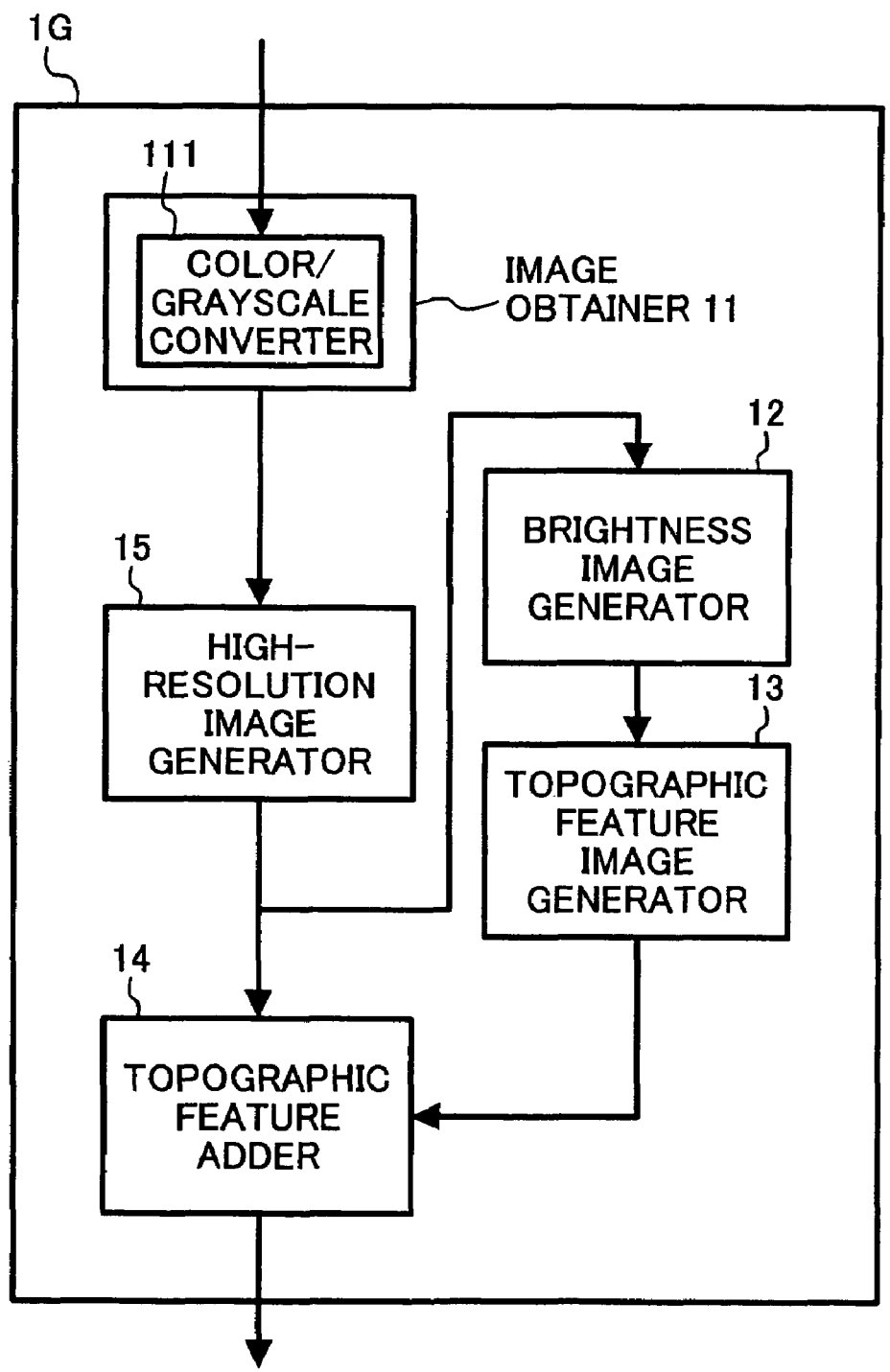
FIG. 7 is a schematic block diagram illustrating a functional structure of an image processor according to another preferred embodiment of the present invention.

Referring to FIG. 7, the image processor 1G is substantially similar in structure to the image processor 1B of FIG. 2. Compared to the image processor 1B, the brightness image generator 12 operates differently, such that it generates a brightness image from the high-resolution image created by the high-resolution image generator 15.

Figure 8:
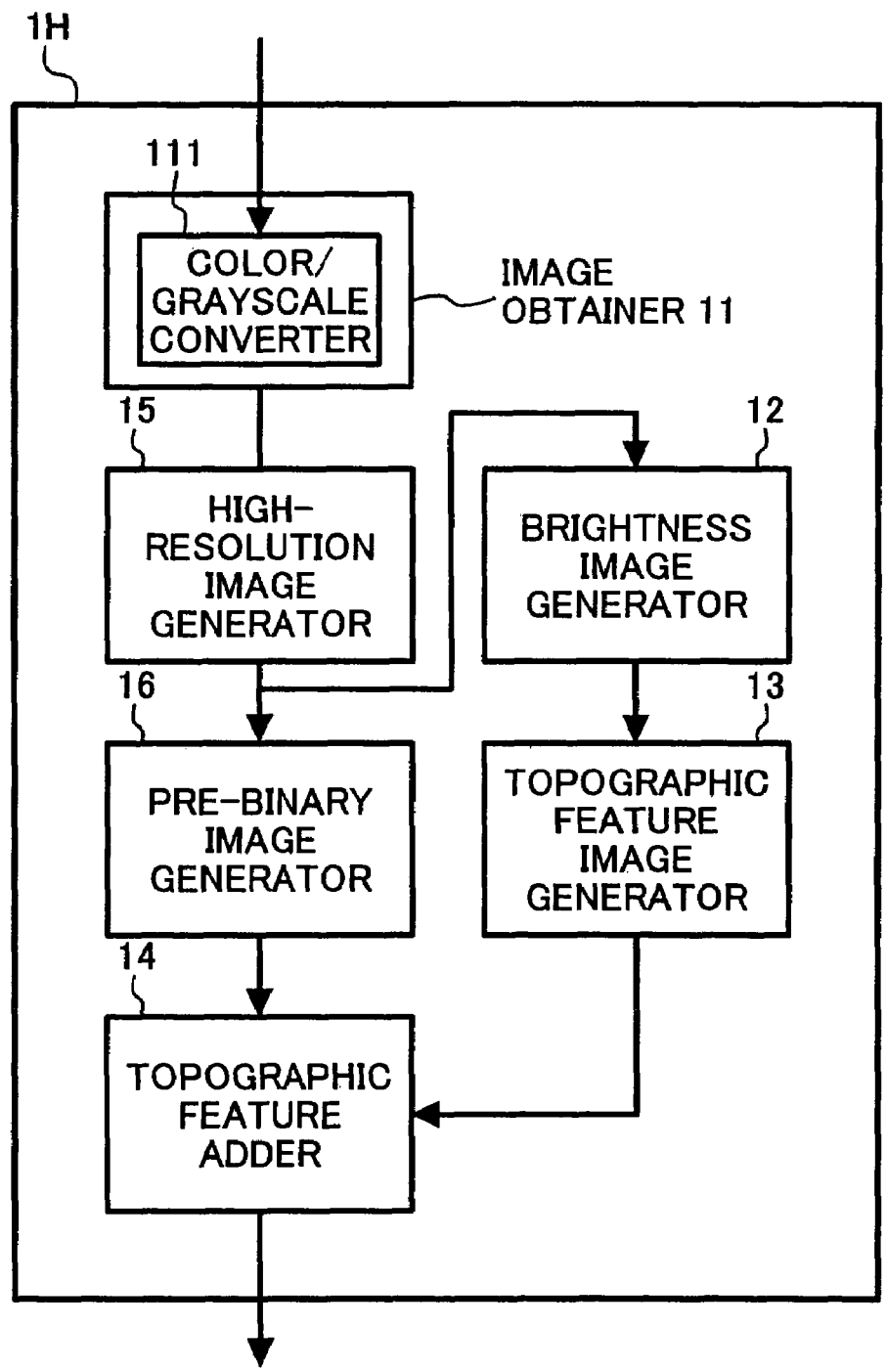
FIG. 8 is a schematic block diagram illustrating a functional structure of an image processor according to another preferred embodiment of the present invention.

Referring to FIG. 8, the image processor 1H is substantially similar in structure to the image processor 1D of FIG. 4. Compared to the image processor 1D, the brightness image generator 12 operates differently, such that it generates a brightness image from the high-resolution image created by the high-resolution image generator 15.

Figure 9:
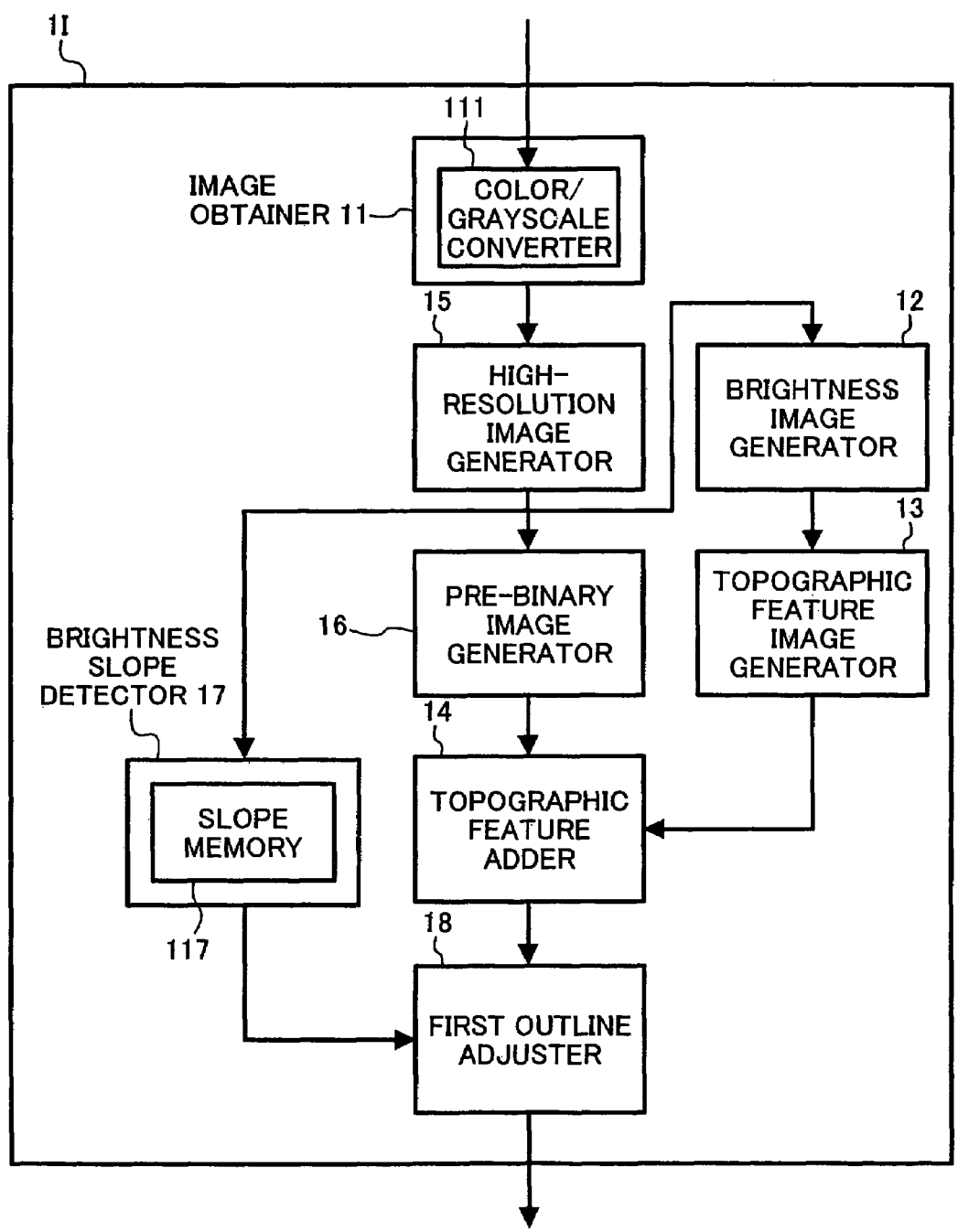
FIG. 9 is a schematic block diagram illustrating a functional structure of an image processor according to another preferred embodiment of the present invention.

Referring to FIG. 9, the image processor 1I is substantially similar in structure to the image processor 1E of FIG. 5. Compared to the image processor 1E, the brightness image generator 12 operates differently, such that it generates a brightness image from the high-resolution image created by the high-resolution image generator 15.

Figure 10:
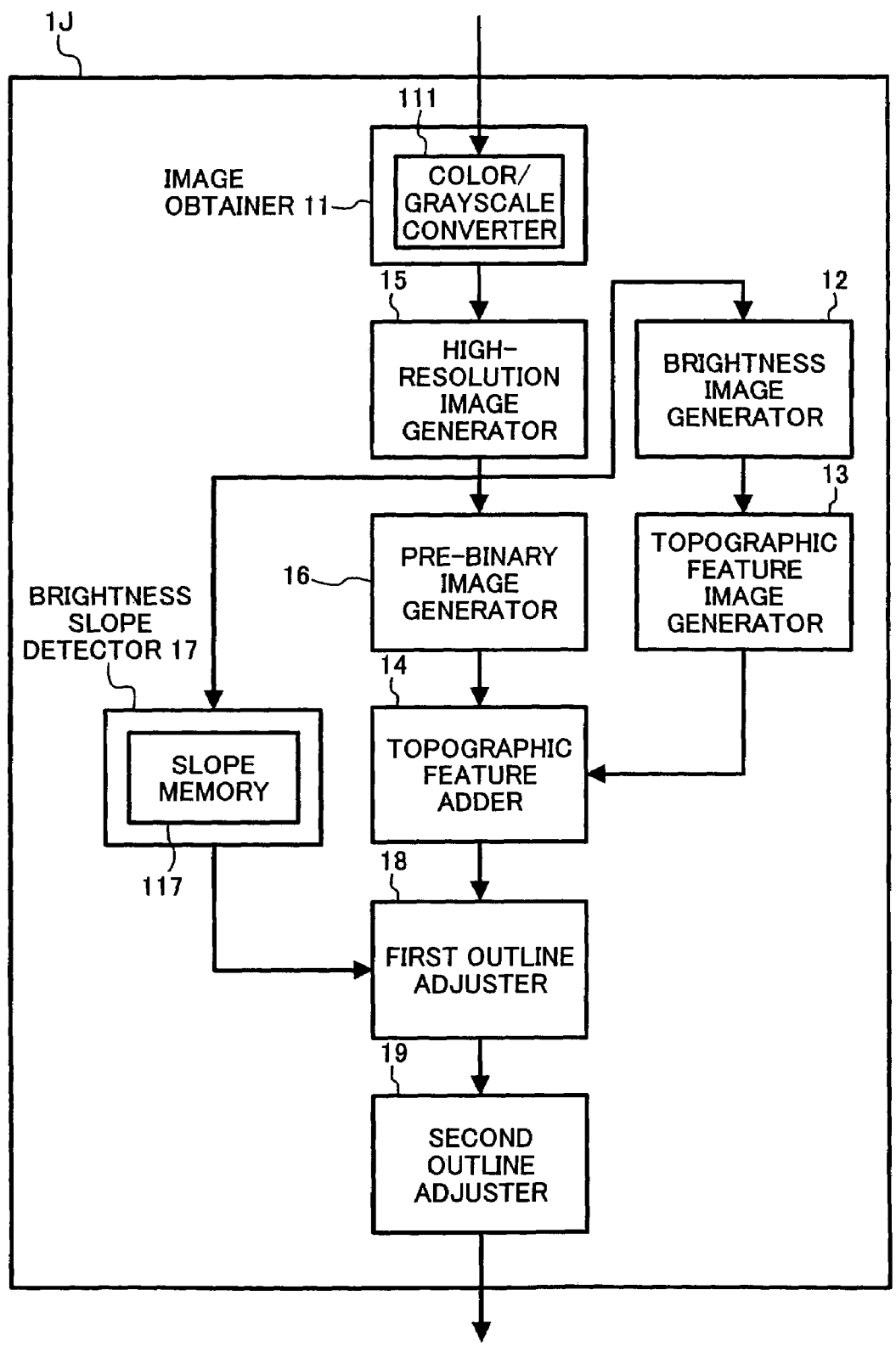
FIG. 10 is a schematic block diagram illustrating a functional structure of an image processor according to another preferred embodiment of the present invention.

Referring to FIG. 10, the image processor 1J is substantially similar in structure to the image processor 1F of FIG. 6. Compared to the image processor 1F, the brightness image generator 12 operates differently, such that it generates a brightness image from the high-resolution image created by the high-resolution image generator 15.

Figure 11:
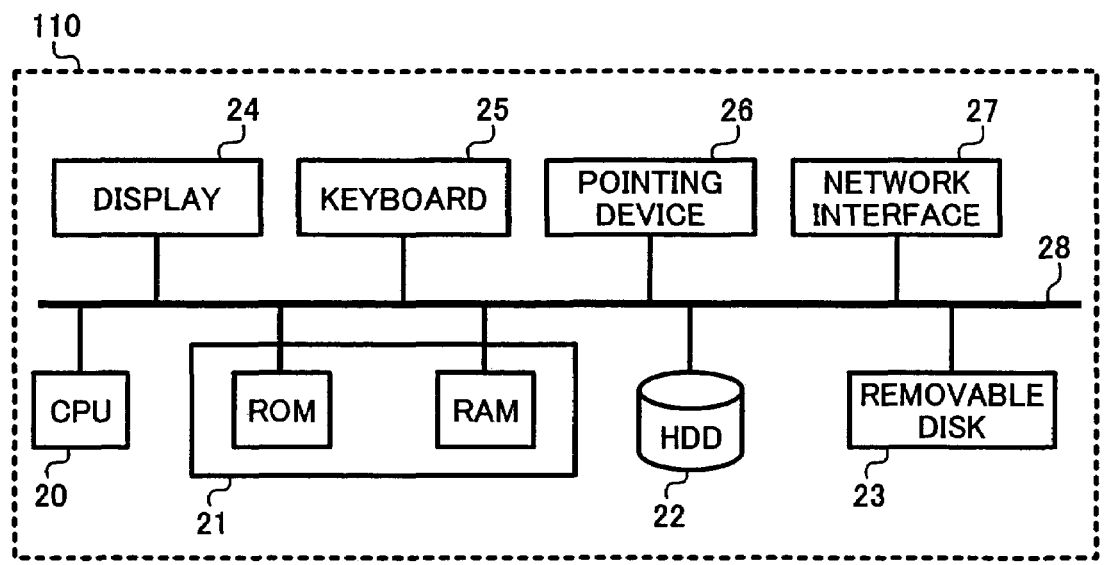
FIG. 11 is a schematic block diagram illustrating an exemplary system incorporating an image processor of the present invention.

Any of the image processors 1A to 1J and other image processors according to the present invention may be incorporated in an image processing system 110 shown in FIG. 11. The image processing system 110 includes a CPU (central processing unit) 20, a memory 21, a HDD (hard disk drive) 22, a removable disk 23, a display 24, a keyboard 25, a pointing device 26, and a network interface 27. The above devices are interconnected via a bus 28.

The CPU 20 controls an entire operation of the system 110. The memory 21 includes a ROM (read only memory) and a RAM (random access memory). The HDD 22 includes any kind of storage device, and stores various image processing programs or instructions to be operated by the CPU 20. The image processing programs include, for example, an image obtaining program, a brightness image generating program, a topographic feature image generating program, a topographic feature adding program, a high-resolution image generating program, a pre-binary image generating program, a brightness slope detecting program, a first outline adjusting program, and a second outline adjusting program (hereinafter, collectively referred to as an "image processing program"). In other words, the above-described image processors 1A to 1J are implemented as the image processing program in this exemplary embodiment.

The removable disk 23 is any kind of removable media, such as a floppy disk, a compact disk, and a magneto-optical disk, and stores a multivalue image, for example, to be processed by the system 110. The display 24 includes a liquid crystal display, for example, capable of displaying the message from the CPU 20 or the multivalue image read out from the removable disk 23. The keyboard 25 is any kind of device that allows a user to input an instruction. The pointing device 26 includes, for example, a mouse, allowing a user to point out the message or an image displayed on the display 24. The network interface 27 allows the system 110 to communicate with other devices or apparatus via a communication line or a network.

Figure 12:
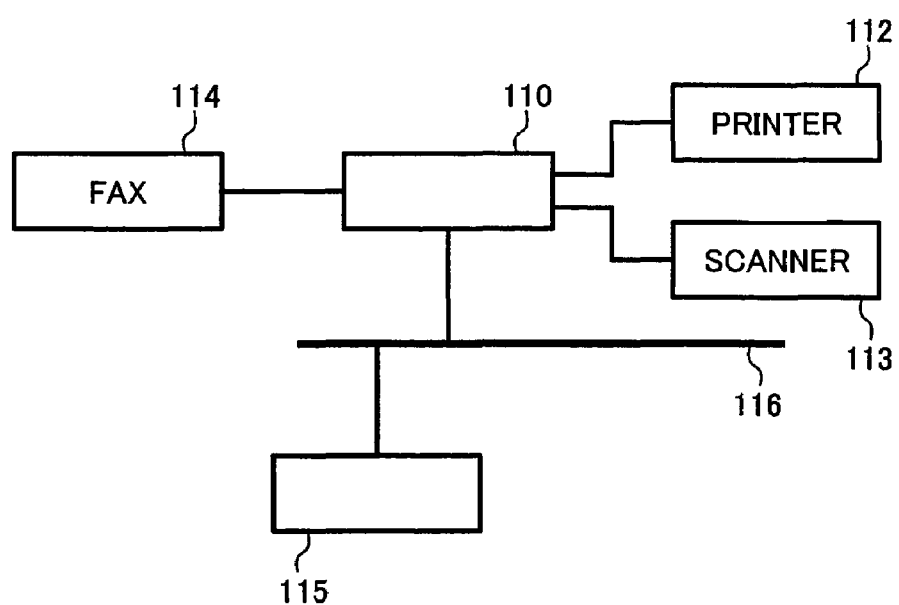
FIG. 12 is a schematic block diagram illustrating another exemplary system incorporating an image processor of the present invention.

FIG. 12 illustrates an exemplary case of connecting the system 110 with other devices or apparatus. In FIG. 12, the system 110 is connected locally to a printer 112, a scanner 113, and a facsimile 114. The system 110 is further connected to another system 115 via a network 116.

The printer 112 is any kind of printer capable of printing an image received from the system 110, including a multifunctional printer. However, if the printer 112 functions as a multifunctional printer, it also has a function of inputting a multivalue image to the system 110, for example.

The scanner 113 is any kind of scanner, capable of optically reading an image to be processed by the image processor.

The facsimile 114 is any kind of facsimile apparatus, capable of providing an image to the system 110 or receiving an image from the system 110.

The system 115 may include any kind of device or apparatus, including a personal computer, facsimile, printer, or scanner, as long as it is connected to the system 110 via the network 116. The system 115 may include another image processor of the present invention, for example. The network 116 is preferably the Internet, however, it is not limited to such example.

When the CPU 20 is powered on, the RAM loads the image processing program from the HDD 22 to start an image processing operation according to a preferred embodiment of the present invention.

As mentioned above, the system 110 can incorporate various forms of image processor, however, the following description assumes that the image processor 1F of FIG. 6 is incorporated in the system 110. In other words, the image processing program according to the image processor 1F of FIG. 6 is executed.

Figure 13:
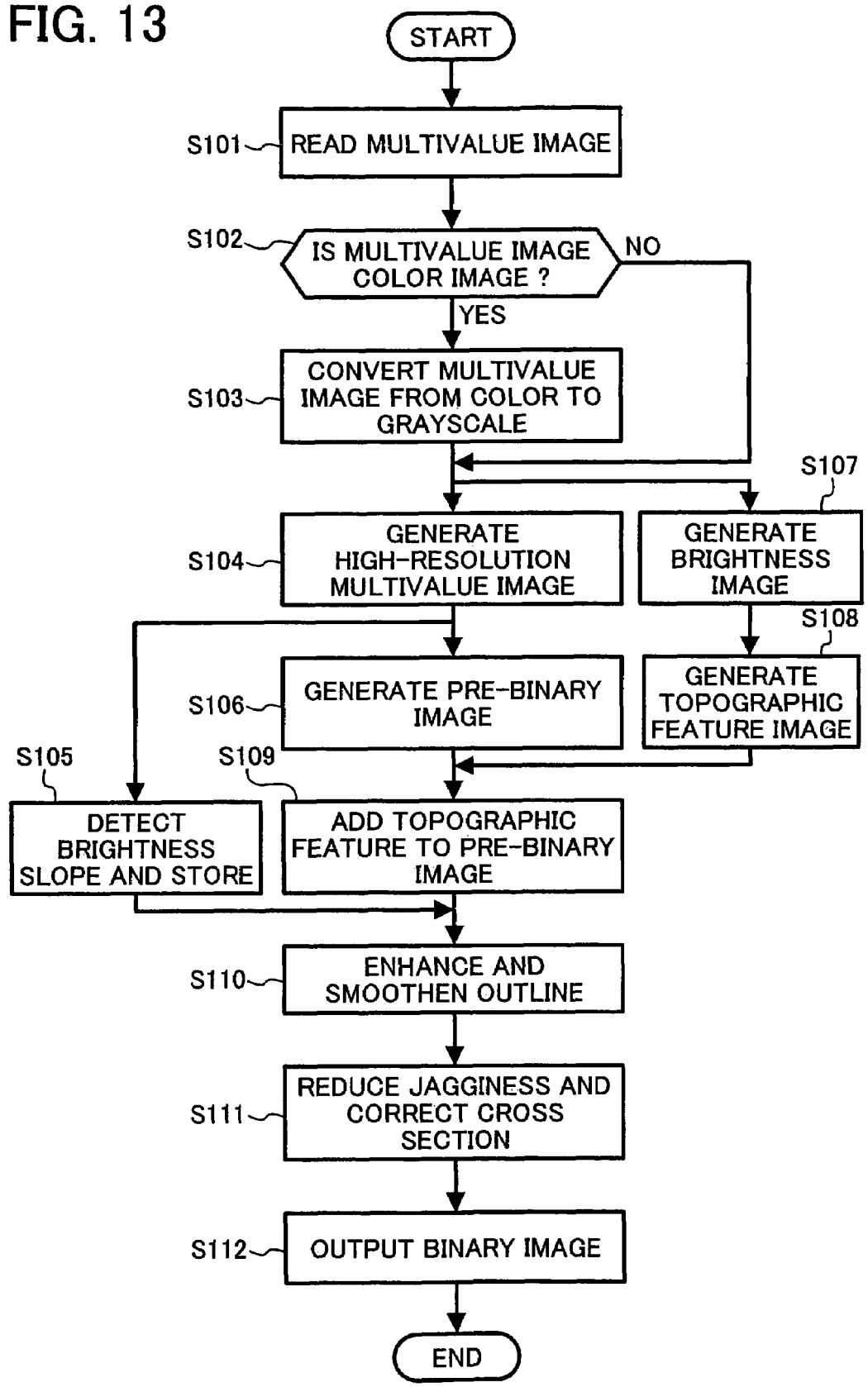
FIG. 13 is a flowchart illustrating a general image processing operation performed by the image processor of FIG. 6.

Referring now to FIG. 13, a general image processing operation of the image processor 1F is explained.

In Step S101, the image obtainer 11 reads out a multivalue image from the removable disk 23. In this example, the multivalue image is previously stored in the removable disk 23, however, the image obtainer 11 may receive a multivalue image from any other device or apparatus, such as the printer 112, the scanner 113, the facsimile 114, or the system 115, connected to the system 110 via the network interface 27.

Figure 14:
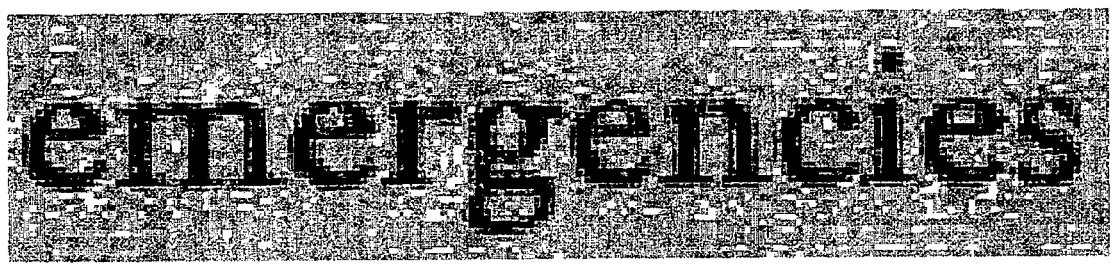
FIG. 14 is an exemplary grayscale image to be processed by the image processor of FIG. 6.
Figure 15:
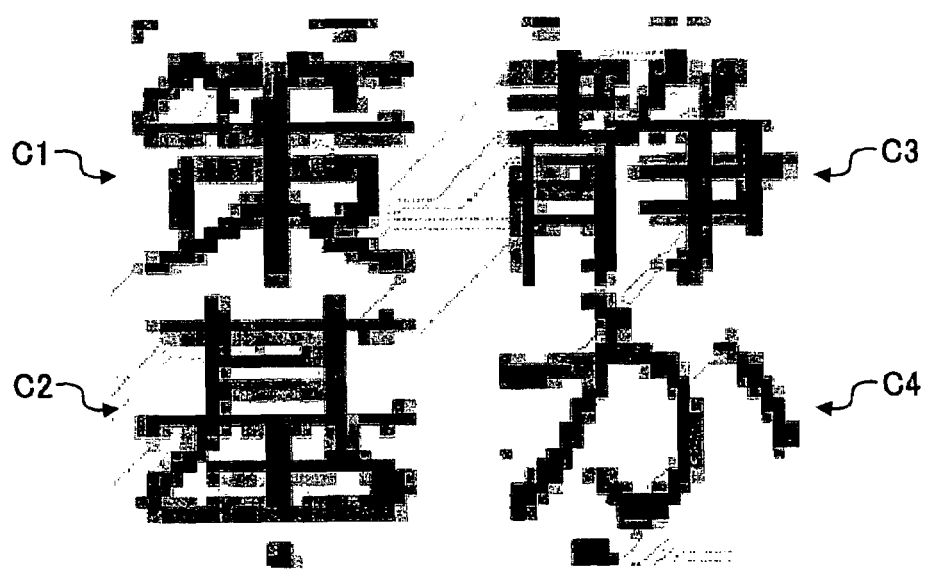
FIG. 15 is another exemplary grayscale image to be processed by the image processor of FIG. 6.

FIG. 14 illustrates an exemplary multivalue image, having English alphabet characters. FIG. 15 illustrates an exemplary multivalue image, including three kanji characters (equivalent to Chinese characters) C1, C2, and C3 and one hiragana character (a type of Japanese character) C4.

In Step S102, the image obtainer 11 determines whether the multivalue image is a color image. If it is a color image, the operation moves to Step S103, and otherwise to Steps S104 and S107.

In Step S103, the color/grayscale converter 111 converts the multivalue image from a color image to a grayscale image.

In Step S104, the high-resolution image generator 15 generates a high-resolution image by using an interpolation technique of any kind. Examples of the interpolation technique includes bicubic, bilinear, nearest neighbor, spline, etc. In this specific example, bilinear interpolation is applied to the multivalue image to increase its resolution. Further, the edges of the interpolated image are smoothened using an anti-alias filter, such as a 3 pixels by 3 pixels linear filter.

Figure 16:
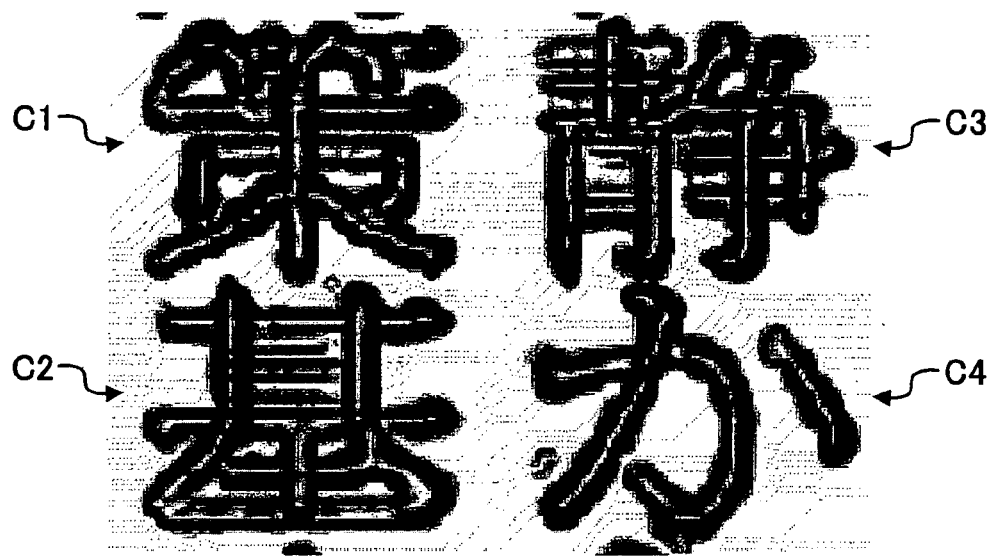
FIG. 16 is an image representing a brightness slope extracted from the image of FIG. 15.

In Step S105, the brightness slope detector 17 detects a specific brightness slope of each pixel of the high-resolution multivalue image, and stores the detected slope values in the slope memory 117. FIG. 16 illustrates the brightness slope corresponding to the character images of FIG. 15. In this case, the greater brightness slope values are indicated as darker areas, and smaller brightness slope values are indicated as lighter areas.

In Step S107, the brightness image generator 12 generates a brightness image from the multi-value image, in a similar manner described referring to FIG. 1.

Figure 17:
FIG. 17 is an exemplary brightness image generated from the image of FIG. 15.

In Step S108, the topographic feature image generator 13 generates a topographic feature image of the multivalue image, based on the brightness image created in the previous step. FIG. 17 illustrates the topographic feature image corresponding to the multivalue image of FIG. 15. Compared to the image of FIG. 15, which is expressed in 256 grayscales, the image of FIG. 17 is expressed in three areas of black, gray (shaded), and white.

The black, gray (shaded), and white areas each indicate the topographic feature of the multivalue image of FIG. 15. In other words, the white areas indicate a peak/ridge region of the image, corresponding to higher brightness values. The black areas indicate a valley/pit region of the image, corresponding to lower brightness values. The gray areas indicate a hillside region of the image, corresponding to medium brightness values.

In Step S106, the pre-binary image generator 16 generates a pre-binary image based on the high-resolution multivalue image created in Step S104.

More specifically, in this example, instead of generating a binary image including on pixels (having 1 values) and off pixels (having 0 values), the pre-binary image generator 16 generates a pre-binary image including on pixels (having 1 values), off pixels (having 0 values), and TBD pixels (having −1 values), as follows.

First, a target pixel (x, y) is selected. Then, a target window including the target pixel (x, y) at its center and neighboring pixels surrounding the target pixel is selected. The size of the target window, i.e., the number of neighboring pixels, should be determined so as to accurately obtain the brightness value of the target pixel. In this example, it is determined depending on the resolution of the high-resolution multivalue image relative to the resolution of the multivalue image.

Using brightness values of the pixels within the target window, the brightness mean m(x, y) and the brightness standard deviation s(x, y) of the target pixel (x, y) are calculated, respectively.

The target pixel (x, y) is determined to be the on pixel, the off pixel, or the TBD pixel, based on the mean m(x, y) and the standard deviation s(x, y).

For example, if the target pixel (x, y) is equal to or less than m(x, y)+k0*s(x, y), the target pixel is determined to be the on pixel, having 1 value. In this case, k0 is an arbitrary parameter having a value between −1 and 1. If the target pixel (x, y) is larger than m(x, y)+k0*s(x, y) and smaller than m(x, y)+k1*s(x, y), the target pixel is determined to be the TBD pixel, having −1 value. In this case, k1 is another arbitrary parameter having a value between 0 and 2, but it is larger than the parameter k0. In any other cases, the target pixel is determined to be the off pixel, having 0 value.

In the character images shown in FIGS. 14 and 15, the on pixels correspond to character outlines, the off pixels correspond to background portions, and the TBD pixels correspond to the pixels that cannot be determined to be the character outlines or the background portions. In other words, the TBD pixels are determined to be either the on or off pixels, using the topographic feature extracted in Step S108.

Figures 18, 19:
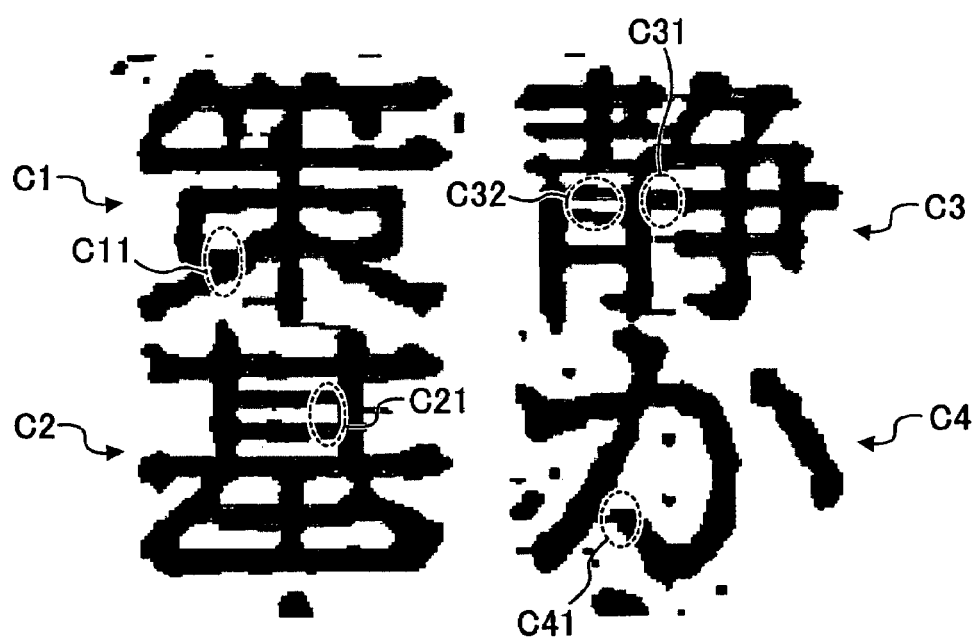
FIG. 18 is an exemplary pre-binary image generated from the image of FIG. 14.
FIG. 19 is another exemplary pre-binary image generated from the image of FIG. 15.

FIG. 18 illustrates the pre-binary image corresponding to the exemplary multivalue image of FIG. 14, and FIG. 19 illustrates the pre-binary image corresponding the exemplary multivalue image of FIG. 15.

Both images indicate the on pixels as black, the off pixels as white, and the TBD pixels as gray (shaded). The image of FIG. 19, which includes the kanji characters, contains a larger number of the TBD pixels when compared to the image of FIG. 18, including the alphabetic characters, which indicates that the kanji characters have line segments more dense than those of the alphabetic characters.

To determine the values of the TBD pixels, the topographic feature adder 14 compares the target TBD pixel in the pre-binary image with the corresponding pixel in the topographic feature image in Step S109.

Figures 20, 21:
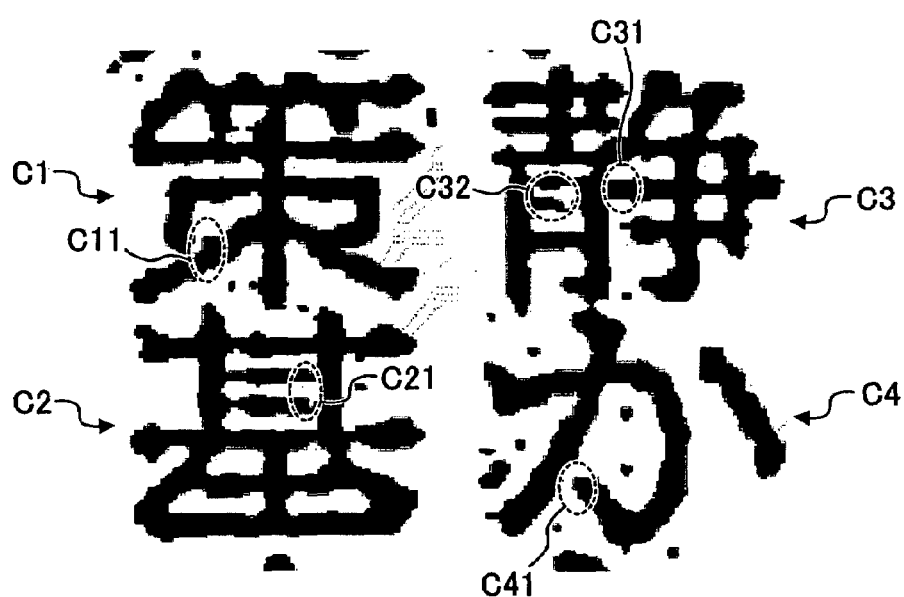
FIG. 20 is an exemplary binary image corresponding to the image of FIG. 14.
FIG. 21 is an exemplary binary image corresponding to the image of FIG. 15.

In the alphabet image of FIG. 18, the TBD pixels are mainly present in the horizontal line segment of the letter "e". Since those TBD pixels all correspond to the valley/pit portions of the topographic feature image (not shown), the TBD pixels are determined to be the on pixels, as shown in FIG. 20. Thus, addition of the topographic feature can compensate the information loss that generally occurs during the conventional binarization process.

Figures 22, 23:
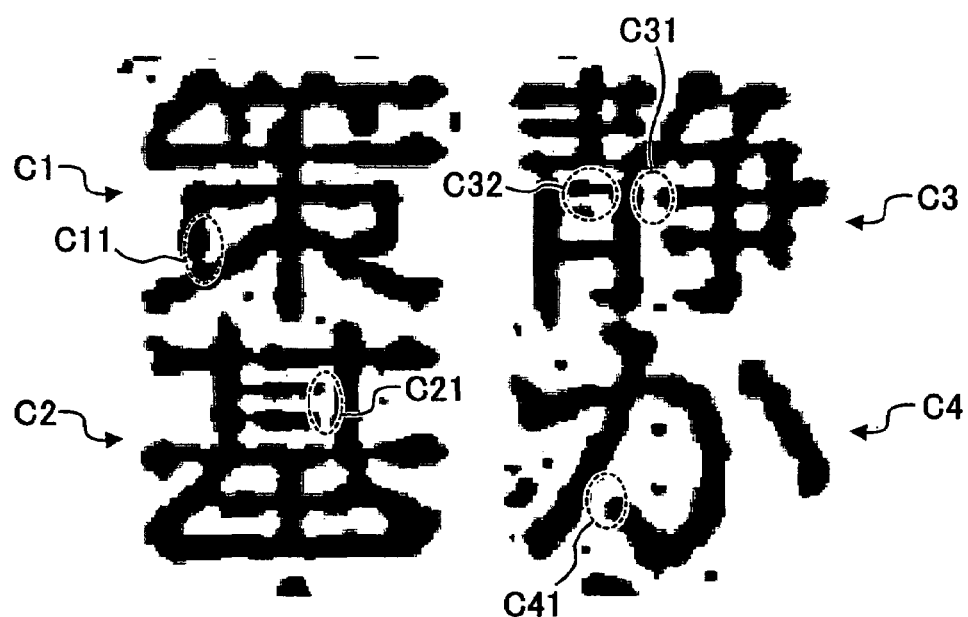
FIG. 22 is an exemplary binary image corresponding to the image of FIG. 14, generated using a conventional binarization technique.
FIG. 23 is an exemplary binary image corresponding to the image of FIG. 15, generated using a conventional binarization technique.

This advantage may be clearly understood, by comparing FIGS. 20 and 22. FIG. 22 is an exemplary binary image generated from the multivalue image of FIG. 14, without adding the topographic feature. As shown in FIG. 22, without the topographic feature, the TBD pixels are wrongly interpreted as the off pixels.

In the kanji and hiragana character image of FIG. 19, the TBD pixels are rather scattered. For the purpose of description, portions having a large number of the TBD pixels are selected, as indicated by C11, C21, C31, C32, and C41.

The TBD pixel portions C11, C21, C31, C32, and C41 are determined to be the on or off pixels, using the topographic feature image of FIG. 17.

The TBD pixel portion C11, which corresponds to the white areas of the topographic feature image, is determined to be the off pixel. The TBD pixel portion C21, which corresponds to the black areas of the topographic feature image, is determined to be the on pixel. The TBD pixel portion C31, which corresponds to the black areas of the topographic feature image, is determined to be the on pixel. The TBD pixel portion C32, which corresponds to the black areas of the topographic feature image, is determined to be the on pixel. The TBD pixel portion C41, which corresponds to the white areas of the topographic feature image, is determined to be the off pixel.

FIG. 21 illustrates the resultant binary image, after adding the topographic feature of FIG. 17 to the pre-binary image of FIG. 19. As shown in FIG. 21, addition of the topographic feature can compensate the information loss that generally occurs during the conventional binarization process.

FIG. 23 illustrates an exemplary binary image generated from the multivalue image of FIG. 15, without adding the topographic feature. As shown in FIG. 23, without the topographic feature being added, the TBD pixel portions C21, C31, and C32 are wrongly interpreted as the off pixels.

In Step S110, the first outline adjuster 18 enhances and smoothens the character outline in the binary image. The character outline is defined as a boundary line between the on pixels and off pixels of the binary image. In this example, enhancing and smoothing operations are performed, using the active contour model, or the so-called "snake".

The snake can be defined as a parameterized curve $v(s)=(x(s), y(s))$, where $x(s)$ and $y(s)$ are x-y coordinate functions of the parameter s ranging from 0 to 1. The snake is controlled by minimizing the following energy function:

$$E=\int(\alpha(s)Econt+\beta(s) Ecurv+\lambda(s)Eimage)ds,$$

wherein $\alpha$, $\beta$, and $\lambda$ are predetermined parameters, which are all set to 1, specifically in this example.

Figure 24:
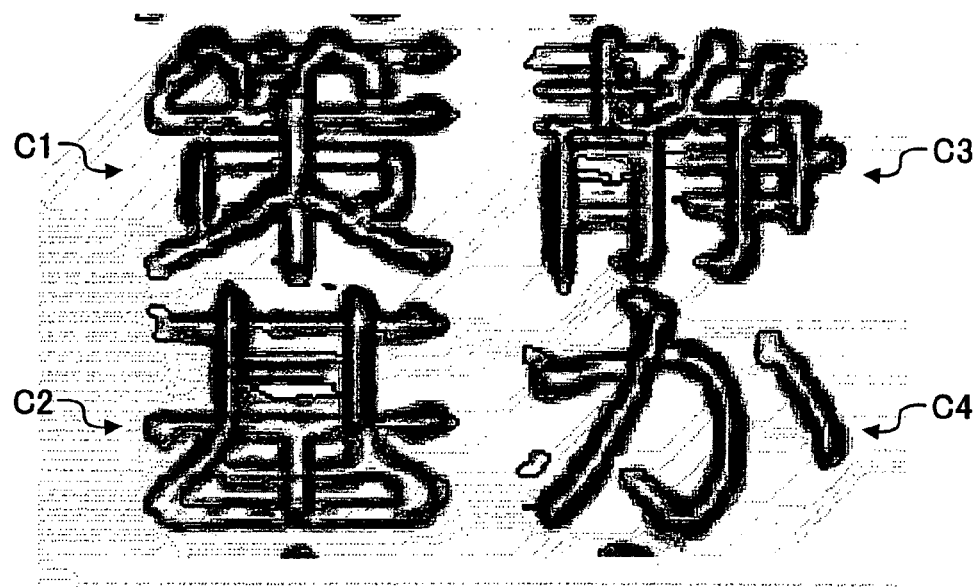
FIG. 24 is an image, generated by combining the image of FIG. 16 and the image of FIG. 23.

In the above function, Econt controls stretch of the snake. Particularly, it causes a sequence of points in the snake to be arranged in a predetermined space interval. Ecurv controls smoothness of the snake. Particularly, it reduces curvature, or increases a curvature radius, of the point sequence in the snake. Eimage attracts the snake to contours with large image gradients. In other words, Eimage may be expressed as $-GH(v(s))$, where GH corresponds to the brightness slope that has been calculated and stored in Step S105. As shown in FIG. 24, the character outline of the multivalue image has greater brightness slope values.

Figure 25:
FIG. 25 is an exemplary binary image, generated by applying the character outline adjustment to the image of FIG. 21.

Using the above snake algorithm, the character outline of the binary image is enhanced and smoothened. FIG. 25 illustrates the binary image corresponding to the image of FIG. 21, created based on the character outline corrected through this step. Comparing FIGS. 21 and 25, it can be easily noticed that image quality of the binary image is greatly enhanced.

The same can be said for another exemplary image of FIG. 20. The resultant binary image of FIG. 26, obtained after applying the snake algorithm to the binary image of FIG. 20, is superior in smoothness to the image of FIG. 20.

In Step S111, the second outline adjuster 19 further smoothens the character outline in the image, particularly smoothening aliased or jaggy edges and sharpening a cross section of vertical and horizontal character lines. In this specific example, such operations are performed using the following clustering technique.

Figures 26, 27:
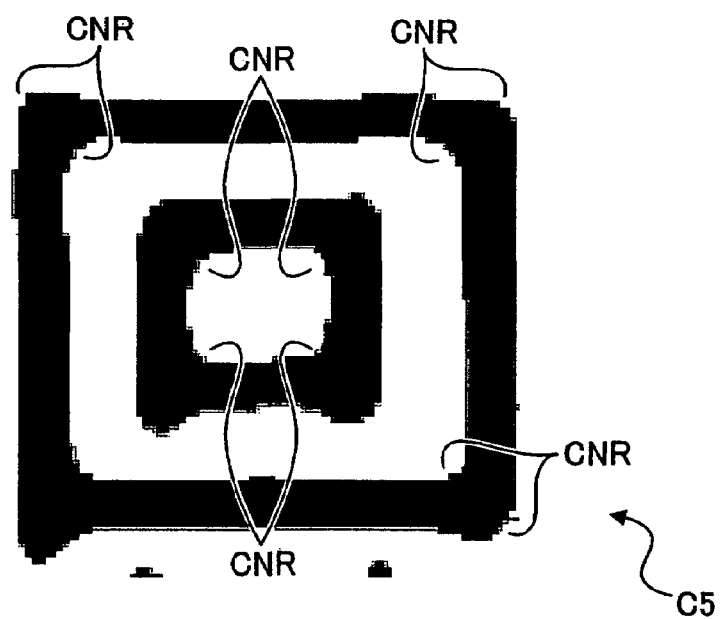
FIG. 26 is an exemplary binary image, generated by applying the character outline adjustment to the image of FIG. 20.
FIG. 27 is an exemplary binary image, including a kanji character.
Figure 28A:
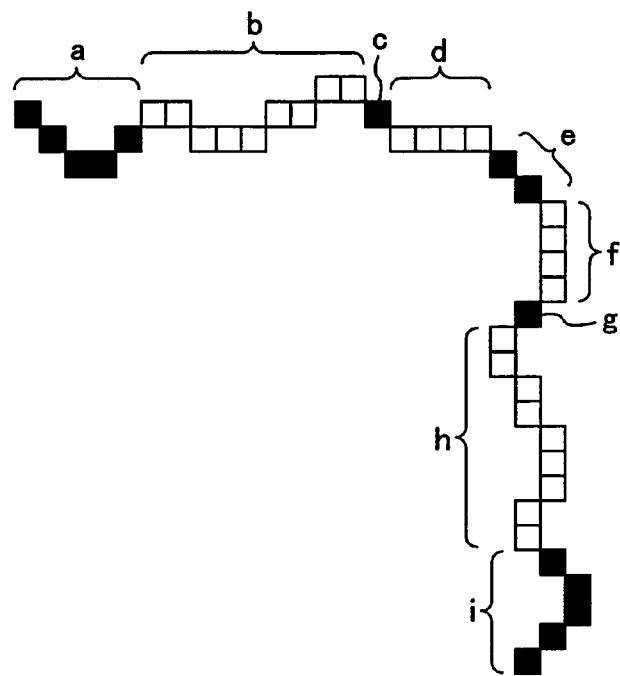
FIG. 28A is an enlarged image illustrating a part of the exemplary binary image of FIG. 27.

For descriptive purposes, the exemplary case is considered of a kanji character C5 illustrated in FIG. 27. The character C5 includes jaggy outlines, and rounded corners indicated as "CNR". In this example, one of the corners CNR is particularly selected to be a target character outline for jag reduction and cross-section correction, as illustrated in FIG. 28A.

First, each of the points p(i) forming the target character outline is labeled, based on its tangential line direction.

The sequence P of points p(i) may be mathematically expressed as p(0), p(1), p(2), . . . p(n−1).

In the above expression, the parameter i represents an index number corresponding to a location of the target point in the point sequence P. The parameter n represents the number of points on the point sequence P.

If the tangential direction of a target point p(i) is close to 0, 90, 180, or 270 degrees, the target point p(i) is given a label L(i) having a value of 0, 1, 2, or 3, respectively. Otherwise, the target point p(i) is given a label L(i) having a value of −1. In other words, if the tangential direction is a value ranging from [(jπ/2)−d] to [(jπ/2)+d], the target point p(i) is labeled the L(i) equal to j. In the above function, the parameter d has an arbitrary value sufficiently small relative to the value π/2, and the parameter j is an index number selected from 0, 1, 2, and 3.

For example, if the target point p(i) has the tangential direction that is close to the horizontal axis, the target point p(i) is labeled 0 or 2. If the target point p(i) has the tangential direction that is close to the vertical axis, the target point p(i) is labeled 1 or 3. In any other cases, the target point p(i) is labeled −1.

Next, the points p(i) having the same label values L(j) are grouped into a cluster C(j), as expressed in the following:

$$C(j)=(p(kj), p(kj+1), \ldots, p(kj+mj-1)),$$

wherein the parameter j represents an indexed number of the cluster C(j), p(kj) represents the first point of the cluster C(j), and the parameter mj represents the number of points included in the cluster C(j).

Figure 29:
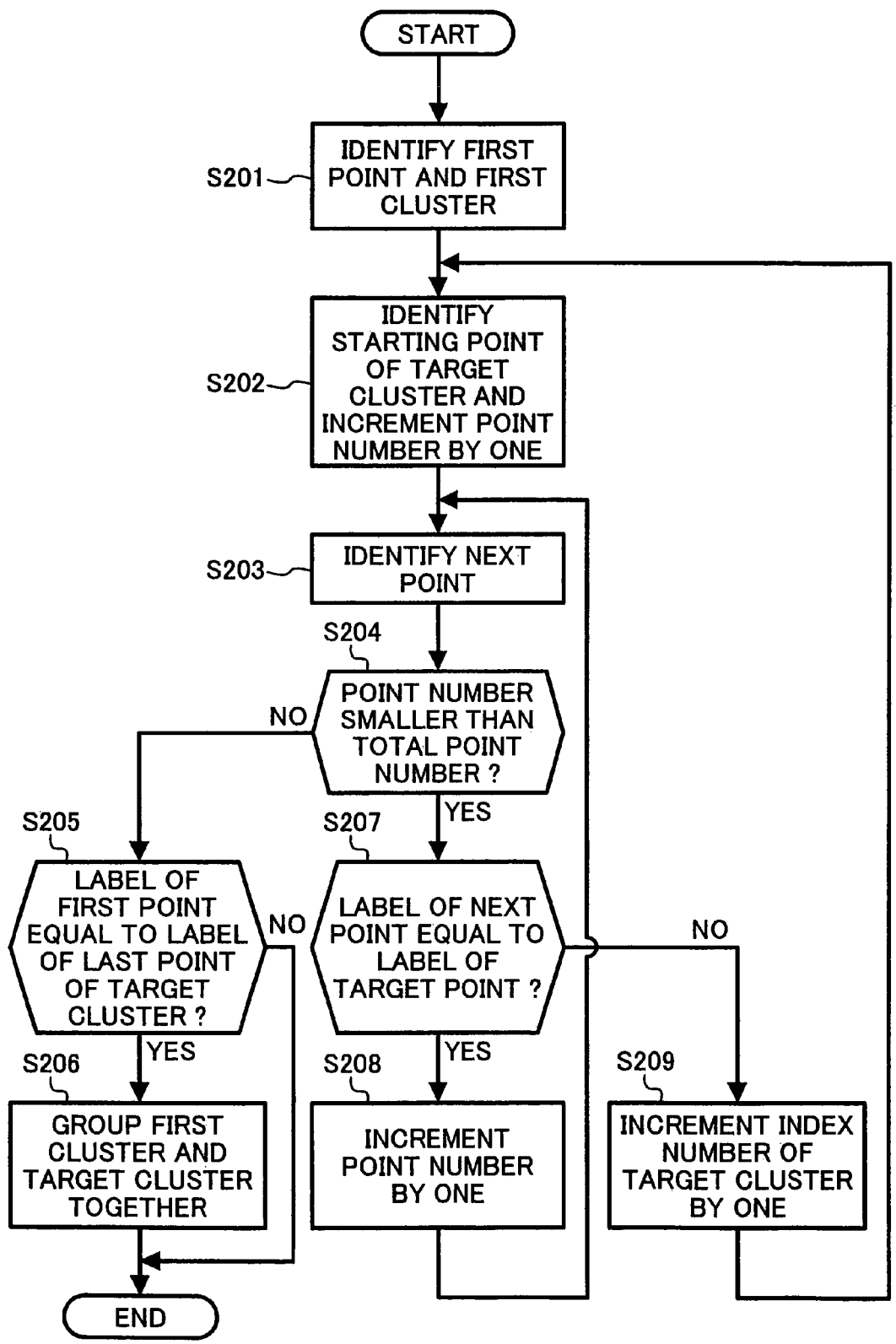
FIG. 29 is a flowchart illustrating an exemplary operation of clustering.

Referring now to FIG. 29, an exemplary operation of clustering is explained.

In Step S201, a point p(i) is selected, particularly the one corresponding to a first point on the target character outline. The selected point p(i) thus has the index value i of k0, and is assumed to belong to a first cluster C(j), having the index value j of 0.

In Step S202, a target point p(kj) is selected, particularly the one adjacent to the point p(k0). The target point p(kj) is assumed to belong to the cluster C(j), with the index value j having the value 1, 2, or 3. At the same time, the number of points in the cluster C(j), expressed as m(j), is set to 1.

In Step S203, the point adjacent to the target point p(kj) is identified and given the index value of (kj+1).

Step S204 checks whether the number of points in the cluster C(j), i.e., the value m(j), is smaller than the value n, which is the number of points in the target character outline. In other words, Step S204 determines whether all the points on the target character outline have been identified. If the number of points in the cluster C(j) is larger than the value n ("NO" in Step S204), it is determined that the all points have been identified, and the process moves to Step S205. Otherwise, the process moves to Step S207.

Step S207 determines whether the label L(j+1) given to the point(kj+1) matches the label L(j) given to the point(kj) of the cluster(j). If yes, the process moves to Step S208 to determine that the point(kj+1) belongs to the cluster(j), otherwise the process moves to Step S209 to start a new cluster(j+1).

In Step S208, the value m(j), which is the number of points in the cluster(j), is incremented by one, and the process moves to Step S203 to repeat the Steps S203 to S208.

In Step S209, the index number j of the cluster(j) is incremented by one. In other words, the point(kj+1) is determined to belong to the cluster(j+1). Then, the process moves to Step S202 to repeat Steps S202 to S207.

Step S205 checks whether the value of the label L(0) given to the starting point(k0) of the cluster(0) matches with the value of the label L(n−1) given to the last point(n−1) of the cluster(j). If yes, the process moves to Step S206, otherwise, the process ends.

In Step S206, the cluster(0) including the point(k0) and the cluster(j) including the point(n−1) are grouped into one cluster. By this step, the index number k0of the point(k0) is renumbered to (kj−n), and the value m0, which is the number of the points included in the cluster(0) is renumbered to (0+j), and the process ends.

This operation of clustering may be summarized as follows:

To group the target cluster(j) and the previous cluster C(j−1) together, the first point p(kj) of the cluster(j) must be equal to the last point p(kj−1+mj−1) of the previous cluster C(j−1). To group the target cluster(j) and the following cluster C(j+1) together, the last point p(kj+mj−1) of the cluster(j) must be equal to the first point (kj+mj) of the following cluster C(j+1).

In the above-described case, since the target cluster(j) and the previous cluster C(j−1) belong to different clusters, the label L(kj−1+mj−1) given to the last point p(kj−1+mj−1) of the previous cluster C(j−1) must be different from the label L(j) given to the first point p(kj) of the cluster C(j). Any of the points included in the target cluster C(j) is assigned the same value of the label, thus satisfying L(kj)=L(kj+1)=. . . L(kj+mj−1). Since the target cluster(j) and the following cluster C(j+1) belong to different clusters, the label L(kj+mj−1) given to the last point p(kj+mj−1) of the cluster C(j) must be different from the label L(kj+1) given to the first point p(j+1) of the next cluster C(j+1).

In the exemplary case illustrated in FIG. 28A, a plurality of clusters a to i are created through the above-described operation. In this case, the clusters b and d are labeled with 0 and 2, respectively. The clusters f and h are labeled with 1 and 3, respectively. The clusters a, d, e, g and i are all labeled with −1.

Next, one of the clusters a to i is selected for jag reduction. If the cluster b or d is selected, the Y coordinate of each point in the selected cluster is obtained, and the mode of Y coordinate values is determined. Thereafter, the Y coordinate values of the respective points are adjusted according to the mode. More specifically, if the difference between the Y coordinate value of the target point and the mode (|Y(kj+1)−M|) is equal to or less than 1, the Y coordinate value of the target point is adjusted to be the mode.

If the cluster f or h is selected, the X coordinate of each point in the selected cluster is obtained, and the mode of X coordinate values is determined. In a similar manner as described above, the X coordinate values of the respective points are adjusted according to the mode.

Figure 28B:
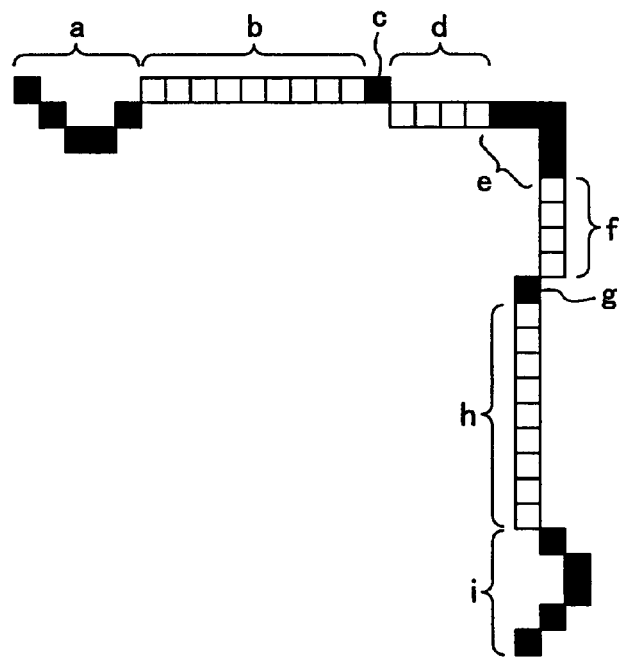
FIG. 28B is an enlarged image illustrating a part of the exemplary binary image of FIG. 27, after jag reduction and cross-section correction are performed.

In this way, the clusters b, d, f and h can be smoothened as illustrated in FIG. 28B.

Next, the cross section of the vertical and horizontal character outlines, i.e., the corner "CNR", is adjusted for sharpness. In this example, such a cross section corresponds to the cluster interposed between the cluster labeled with 0 or 2 and the cluster labeled with 1 or 3, satisfying the following conditions:

The label L(j−1) given to the previous cluster(j−1) must be equal to or greater than 0; the label L(j) given to the target cluster(j) must be less than 0; the label L(j+1) given to the following cluster(j+1) must be greater than 0; and the label L(j−1) is not equal to the label (j+1).

Figures 30, 31A, 31B:
FIG. 30 is an exemplary binary image corresponding to the image of FIG. 27, after jag reduction and cross-section are performed.
FIG. 31A is an exemplary multivalue image produced in low resolution.
FIG. 31B is an exemplary binary image produced in high resolution based on the image of FIG. 31A.

If the number of points included in the target cluster is small, as in the cluster e of FIG. 28A, the adjacent clusters d and f may be extended until they meet each other. In this way, the sharpened corner can be created, as illustrated in FIG. 28B. Based on this corrected character outline, the binary image of FIG. 30 is generated based on the image of FIG. 27. Comparing FIG. 27 and FIG. 30, it is easily noticed that the image of FIG. 30 is superior to the image of FIG. 27 in image quality.

In Step S112, the image processor 1F converts a vector image to a raster image. The image processor 1F then outputs the resultant binary image, for example, to the display 24 in the system 110, or any other device connected to the system 110.

FIG. 31A illustrates another exemplary multivalue image, including kanji characters and hiragana characters. FIG. 31B illustrates the exemplary binary image corresponding to the multivalue image, after applying the above-described image processing. Particularly, in this case, the original image of FIG. 31A has the resolution of 200 dpi, while the processed image of FIG. 31B has the resolution of 800 dpi. It can be easily noticed that each character of the original image of FIG. 31A is accurately reproduced in the processed image of FIG. 31B, with enhanced image quality.

Figure 32:
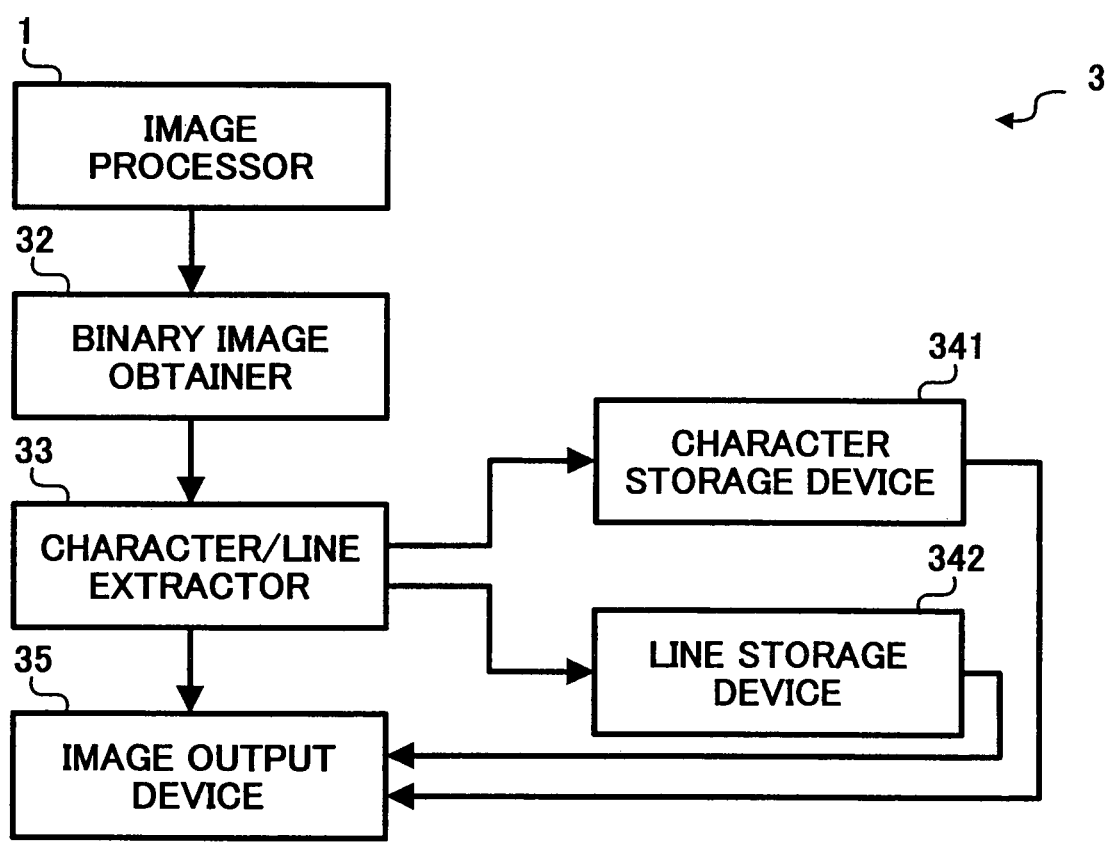
FIG. 32 is a schematic diagram illustrating an exemplary system incorporating an image processor of the present invention.

In addition to the exemplary systems illustrated in FIGS. 11 and 12, any of the image processors 1A to 1J (hereinafter, collectively referred to as the "image processor 1") may be operated with an exemplary system illustrated in FIG. 32.

In this case, the image processor 1 is incorporated into an image reader 3, such as an OCR, capable of recognizing an image, particularly the one including characters and symbols.

The image reader 3 additionally includes a binary image obtainer 32, a character/line extractor 33, a character storage device 341, a line storage device 342, and an image output device 35.

The binary image obtainer 32 receives a high-resolution binary image from the image processor 1. The character/line extractor 33 extracts a portion of the image, including characters and/or lines. The character storage device 341 stores the character portion in a character code format. The line storage device stores the line portion in a vector or raster format. The image output device 35 outputs the character portion and the line portion to other devices connected to the image reader 3, separately from each other, or after combining the character and line portions.

If the original image processed by the image processor 1 is a color image, the image reader 3 may store color information in a memory (not shown) along with the character or line portion of the image. In such a case, the image output device 35 may output the image in color, by adding the color information to the character and/or line portion.

Numerous additional modifications and variations are possible in light of the above teachings. It is therefore to be understood that within the scope of the appended claims, the disclosure of this patent specification may be practiced otherwise than as specifically described herein.

For example, the above description emphasizes on the general image forming operation performed by the image processor 1F of FIG. 6, however, an image forming operation of the present invention. is not limited to such example.

Further, image processing techniques described above according to the present invention may be combined with other conventional techniques, such as filtering, contrast enhancement, model-based image restoration, resolution expansion, etc., as will be apparent to those skilled in the art.

The present invention claims priority to Japanese patent application No. JPAP2003-290614 filed on Aug. 8, 2003, in the Japanese Patent Office, the entire contents of which are incorporated by reference herein.

What is claimed as new and desired to be protected by Letters Patent of the United States is:

1. An image processor, comprising:
   an image obtainer configured to obtain a multivalue image, the multivalue image containing a character or line portion and a background portion;
   a brightness image generator configured to generate a brightness image of the multivalue image, representing brightness values of respective pixels of the multivalue image, wherein the brightness image is expressed in an XYZ coordinate system, with X corresponding to main scanning directions of the respective pixels, Y corresponding to a subscanning directions of the respective pixels, and Z corresponding to the brightness values of the respective pixels;
   a topographic feature image generator configured to generate a topographic feature image of the multivalue image, having a topographic feature corresponding to the brightness values of the brightness image; and
   a topographic feature adder configured to generate a binary image of the multivalue image, by using information contained in the topographic feature of the topographic feature image.

2. The image processor of claim 1, wherein the topographic feature image comprises a peak/ridge region, a hillside region, and a valley/pit region, and wherein a brightness value range of the peak/ridge region is higher than a brightness value range of the hillside region, and a brightness value range of the valley/pit region is lower than the brightness value range of the hillside region.

3. The image processor of claim 2, wherein the valley/pit region of the topographic feature image corresponds to the character or line portion of the multivalue image, and the peak/ridge region of the topographic feature image corresponds to the background portion.

4. The image processor of claim 1, further comprising: a color/grayscale converter configured to convert the multivalue image from a color image to a grayscale image, when the multivalue image is provided in color.

5. The image processor of claim 1, further comprising: a high-resolution image generator configured to generate a high-resolution image, by increasing a resolution of the multivalue image.

6. The image processor of claim 5, wherein the binary image is generated from the high-resolution image.

7. The image processor of claim 5, wherein the brightness image is generated directly from the multivalue image.

8. The image processor of claim 5, wherein the brightness image is generated directly from the high-resolution image.

9. The image processor of claim 8, wherein the high-resolution image generator applies filtering to the multivalue image.

10. The image processor of claim 5, wherein the high-resolution image generator applies an interpolation technique to the multivalue image.

11. The image processor of claim 5, further comprising: a pre-binary image generator configured to generate a pre-binary image, having a number of brightness values less than a number of the brightness values of the multivalue image, wherein the binary image is generated from the pre-binary image.

12. The image processor of claim 11, wherein the brightness image is generated directly from the multivalue image.

13. The image processor of claim 11, wherein the brightness image is generated directly from the pre-binary image.

14. The image processor of claim 11, wherein the pre-binary image includes on pixels, off pixels, and TBD pixels, with the on pixels corresponding to the character or line portion of the multivalue image, the off pixels corresponding to the background portion of the multivalue image, and the TBD pixels corresponding either to the character or line portion and the background portion of the multivalue image.

15. The image processor of claim 14, wherein the on pixels, the off pixels, and the TBD pixels are determined through a statistical information processing method.

16. The image processor of claim 15, wherein the statistical information processing method includes the steps of: selecting a target pixel; selecting neighboring pixels surrounding the target pixels; calculating a mean and a standard deviation of brightness values of the target pixel and the neighboring pixels, respectively; and determining whether the target pixel corresponds to the on pixels, the off pixel, or the TBD pixel, according to the mean and the standard deviation.

17. The image processor of claim 16, wherein the number of neighboring pixels is determined according to a resolution of the high-resolution image.

18. The image processor of claim 11, further comprising: a brightness slope detector configured to detect brightness slope values of the respective pixels of the high-resolution image; a slope memory configured to store the brightness slope values; and a first outline adjuster configured to enhance and smoothen an outline in the binary image using the brightness slope values.

19. The image processor of claim 18, wherein the first outline adjuster applies an active contour model.

20. The image processor of claim 18, further comprising: a second outline adjuster configured to further enhance and smoothen the outline in the binary image.

21. The image processor of claim 20, wherein jagginess of the outline in the binary image is reduced, and a corner portion in the binary image is sharpened.

22. The image processor of claim 21, wherein the second outline adjuster applies a clustering technique to the binary image.

23. The image processor of claim 22, wherein the clustering technique includes the steps of: assigning respective points, which form the outline in the binary image, with values corresponding to tangential line directions of the respective points; and classifying the respective points into a plurality of clusters according to the assigned values.

24. An image processor comprising:
an image obtainer configured to obtain a multivalue image, the multivalue image containing a character or line portion and a background portion;
a brightness image generator configured to generate a brightness image of the multivalue image, representing brightness values of respective pixels of the multivalue image;
a topographic feature image generator configured to generate a topographic feature image of the multivalue image, having a topographic feature corresponding to the brightness values of the brightness image;
a topographic feature adder configured to generate a binary image of the multivalue image, by using information contained in the topographic feature of the topographic feature image; and
a pre-binary image generator configured to generate a pre-binary image, having a number of brightness values less than a number of the brightness values of the multivalue image, wherein the binary image is generated from the pre-binary image.

25. The image processor of claim 24, wherein the topographic feature image includes a peak/ridge region, a hillside region, and a valley/pit region, and wherein a brightness value range of the peak/ridge region is higher than a brightness value range of the hillside region, and a brightness value range of the valley/pit region is lower than the brightness value range of the hillside region.

26. The image processor of claim 25, wherein the TBD pixels are determined to be the on pixels when the TBD pixels correspond to the valley/pit region of the topographic feature image, and the TBD pixels are determined to be the off pixels when the TBD pixels correspond to the peak/ridge region of the topographic feature image.

27. An image processing system, comprising:
an image processor;
a binary image obtainer configured to receive a binary image from the image processor;
a character/line extractor configured to extract at least one of a character portion and a line portion of the binary image;
a character storage device configured to store the character portion in a character code format;
a line storage device configured to store the line portion in a vector or raster format; and an image output device configured to output the character portion and the line portion, wherein the image processor comprises:
an image obtainer configured to obtain a multivalue image, the multivalue image containing a character or line portion and a background portion;
a brightness image generator configured to generate a brightness image of the multivalue image, representing brightness values of respective pixels of the multivalue image, wherein the brightness image is expressed in an XYZ coordinate system, with X corresponding to main scanning directions of the respective pixels, Y corresponding to the subscanning directions of the respective pixels, and Z corresponding to the brightness of the respective pixels;
a topographic feature image generator configured to generate a topographic feature image of the multivalue image, having a topographic feature corresponding to the brightness values of the brightness image; and
a topographic feature adder configured to generate the binary image of the multivalue image, by using information contained in the topographic feature of the topographic feature image.

28. An image processing method, comprising:
using a processor, for performing the following steps:
obtaining a multivalue image, the multivalue image containing a character or line portion and a background portion;
generating a brightness image of the multivalue image, representing brightness values of respective pixels of the multivalue image, wherein the brightness image is expressed in an XYZ coordinate system, with X corresponding to main scanning directions of the respective pixels, Y corresponding to the subscanning directions of the respective pixels, and Z corresponding to the brightness values of the respective pixels;
generating a topographic feature image of the multivalue image, having a topographic feature corresponding to the brightness values of the brightness image; and
generating a binary image of the multivalue image, by using information contained in the topographic feature of the topographic feature image.

29. A computer readable medium storing computer instructions for performing an image processing method, the image processing method comprising:
obtaining a multivalue image, the multivalue image containing a character or line portion and a background portion;
generating a brightness image of the multivalue image, representing brightness values of respective pixels of the multivalue image, wherein the brightness image is expressed in an XYZ coordinate system, with X corresponding to main scanning directions of the respective pixels, Y corresponding to the subscanning directions of the respective pixels, and Z corresponding to the brightness values of the respective pixels;
generating a topographic feature image of the multivalue image, having a topographic feature corresponding to the brightness values of the brightness image; and
generating a binary image of the multivalue image, by using information contained in the topographic feature of the topographic feature image.

30. A computer readable medium storing computer instructions for performing an image processing method, the image processing method comprising:
obtaining a multivalue image, the multivalue image containing a character or line portion and a background portion;
generating a brightness image of the multivalue image, representing brightness values of respective pixels of the multivalue image;

generating a topographic feature image of the multivalue image, having a topographic feature corresponding to the brightness values of the brightness image;

generating a binary image of the multivalue image, by using information contained in the topographic feature of the topographic feature image; and generating a pre-binary image, having a number of brightness values less than a number of the brightness values of the multivalue image, wherein the binary image is generated from the pre-binary image.

\* \* \* \* \*